(12) United States Patent
Sumner et al.

(10) Patent No.: US 11,291,222 B2
(45) Date of Patent: *Apr. 5, 2022

(54) CARBOHYDRATE COMPOSITIONS

(71) Applicant: Cargill, Incorporated, Wayzata, MN (US)

(72) Inventors: Eric Stanley Sumner, Minneapolis, MN (US); Guo-Hua Zheng, Centerville, OH (US)

(73) Assignee: CARGILL, INCORPORATED, Wayzata, MN (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/777,241

(22) PCT Filed: Mar. 15, 2014

(86) PCT No.: PCT/US2014/030010
§ 371 (c)(1),
(2) Date: Sep. 15, 2015

(87) PCT Pub. No.: WO2014/145276
PCT Pub. Date: Sep. 18, 2014

(65) Prior Publication Data
US 2016/0015065 A1    Jan. 21, 2016

Related U.S. Application Data

(60) Provisional application No. 61/792,617, filed on Mar. 15, 2013.

(51) Int. Cl.
| | | |
|---|---|---|
| *A23L 7/00* | (2016.01) | |
| *A23L 5/00* | (2016.01) | |
| *A23L 29/30* | (2016.01) | |
| *A23L 2/60* | (2006.01) | |
| *A23L 33/20* | (2016.01) | |
| *A23L 33/26* | (2016.01) | |
| *C08B 37/00* | (2006.01) | |

(52) U.S. Cl.
CPC ........ *A23L 7/00* (2016.08); *A23L 2/60* (2013.01); *A23L 5/00* (2016.08); *A23L 29/30* (2016.08); *A23L 33/20* (2016.08); *A23L 33/26* (2016.08); *C08B 37/0009* (2013.01)

(58) Field of Classification Search
CPC ... A23L 7/00; A23L 5/00; A23L 33/26; A23L 29/30; A23L 33/20; A23L 2/60; C08B 37/0009
USPC .................. 426/590, 658; 127/30
See application file for complete search history.

(56) References Cited

U.S. PATENT DOCUMENTS

| | | |
|---|---|---|
| 2,719,179 A | 9/1955 | Tibor |
| 3,654,082 A | 4/1972 | Mukhtar |
| 3,692,580 A | 9/1972 | Mamoru |
| 3,756,853 A | 9/1973 | Meyer |
| 3,766,165 A | 10/1973 | Rennhard |
| 3,804,715 A | 4/1974 | Sugimoto |
| 3,838,006 A | 9/1974 | Hijiya |
| 3,876,794 A | 4/1975 | Rennhard |
| 4,009,291 A | 2/1977 | Mitchell |
| 4,011,392 A | 3/1977 | Rudolph |
| 4,017,363 A | 4/1977 | McMullen |
| 4,095,992 A | 6/1978 | Rudolph |
| 4,144,357 A | 3/1979 | Mohammed |
| 4,182,756 A | 1/1980 | Guzek |
| 4,445,938 A | 5/1984 | Verwaerde |
| 4,782,045 A | 11/1988 | Machida |
| 4,941,990 A | 7/1990 | McLaughlin |
| 4,965,354 A † | 10/1990 | Yanaki |
| 5,087,461 A | 2/1992 | Levine |
| 5,124,162 A | 6/1992 | Boš |
| 5,139,575 A | 8/1992 | Matsuda |
| 5,254,174 A | 10/1993 | Hansen |
| 5,266,467 A | 11/1993 | Inglett |
| 5,424,418 A † | 6/1995 | Duflot |
| 5,431,951 A | 7/1995 | Bamford |
| 5,573,794 A † | 11/1996 | Duflot |
| 5,601,863 A | 2/1997 | Borden |
| 5,620,871 A | 4/1997 | Caboche |
| 5,633,369 A | 5/1997 | Jamas |
| 5,645,647 A | 7/1997 | Guzek |
| 5,663,324 A | 9/1997 | James |

(Continued)

FOREIGN PATENT DOCUMENTS

| | | |
|---|---|---|
| EP | 0415720 B1 | 6/1996 |
| EP | 0554818 B1 | 5/1998 |

(Continued)

OTHER PUBLICATIONS

Hobbs, L. Sweeteners from Starch: Production, Properties and Uses. In: Starch: Chemistry and Technology, Third Edition, 2009, Elsevier Inc., pp. 797-832 [online], [retrieved on Jul. 1, 2014]. Retrieved from the Internet <URL:http://nfscfaculty.tamu.edu/talcott/courses/FSTC605/Papers%20Reviewed/Sweetners%20from%20starch.pdf>; p. 798, paragraph 1; p. 801, figure 21.2; p. 602, paragraph 4; p. 822, figures 21.17 and 21.18.

Woiciechowski, AL et al. Acid and Enzymatic Hydrolysis to Recover Reducing Sugars from Cassava Bagasse: an Economic Study. Brazilian Archives of Biology and Biotechnology, vol. 45, No. 3, Sep. 2002, pp. 292-400; p. 396, column 2, paragraph 2.

Hiroshi Fujimoto, et al., "Enzymatic Syntheses of Glucobioses by a Condensation Reaction with α-Glucosidase, ß-Glucosidases and Glucoamylase", Agric. Biol. Chem., 52(6), 1345-1351, 1988.

J. A. Johnson, et al., "Physical and Chemical Properties of Oligosaccharides1", Cereal Chem.; U.S.A.; DA. 1975; vol. 52; No. 1; pp. 70-78; Bibl. 1 p. 1/2.

(Continued)

*Primary Examiner* — Leslie A Wong

(57) ABSTRACT

Carbohydrate compositions having lower digestibility and lower sugar compared to traditional nutritive sweeteners, methods of making the carbohydrate compositions, and food products comprising the carbohydrate compositions are disclosed.

20 Claims, 13 Drawing Sheets

(56) References Cited

U.S. PATENT DOCUMENTS

| | | |
|---|---|---|
| 5,756,721 A | 5/1998 | Eden |
| 5,780,620 A | 7/1998 | Mandai |
| 5,811,542 A | 9/1998 | Jamas |
| 5,853,487 A | 12/1998 | Tang |
| 5,919,668 A | 7/1999 | Mandai |
| 6,056,980 A | 5/2000 | Unno |
| 6,068,705 A | 5/2000 | Tang |
| 6,126,986 A | 10/2000 | Harris |
| 6,287,826 B1 | 9/2001 | Norman |
| 6,329,182 B1 | 12/2001 | Pedersen |
| 6,348,264 B1 | 2/2002 | Abou-Nemeh |
| 6,423,833 B1 | 7/2002 | Catani |
| 6,475,552 B1 | 11/2002 | Shah |
| 6,559,302 B1 | 5/2003 | Shah |
| 6,613,898 B1 | 9/2003 | Barresi |
| 6,630,586 B1 | 10/2003 | Fouache et al. |
| 6,713,116 B1 | 3/2004 | Aldrich |
| 6,720,418 B2 | 4/2004 | Antrim |
| 6,780,990 B1 | 8/2004 | Le |
| 6,919,446 B1 | 7/2005 | Antrim |
| 7,303,905 B2 | 12/2007 | Breves |
| 7,405,293 B1 | 7/2008 | Barresi |
| 7,608,436 B2 | 10/2009 | Harrison |
| 8,057,840 B2 | 11/2011 | Harrison |
| 8,361,235 B2 | 1/2013 | Fosdick |
| 9,730,464 B2 * | 8/2017 | Fosdick .............. A23G 9/34 |
| 2003/0175215 A1 | 9/2003 | Parker |
| 2006/0051812 A1 | 3/2006 | Helin |
| 2006/0108081 A1 | 5/2006 | Onic |
| 2006/0172392 A1 | 8/2006 | Zhou et al. |
| 2007/0116825 A1 | 5/2007 | Prakash |
| 2007/0116839 A1 | 5/2007 | Prakash |
| 2007/0172511 A1 | 7/2007 | Harrison |
| 2008/0175977 A1 | 7/2008 | Harrison |
| 2009/0215718 A1 | 8/2009 | Van Laere |
| 2010/0047432 A1 | 2/2010 | Harrison |
| 2010/0129497 A1 | 5/2010 | Rinaldi |
| 2010/0254949 A1 | 10/2010 | Barboza |
| 2011/0020496 A1 | 1/2011 | Shimada |
| 2011/0061645 A1 | 3/2011 | Fosdick et al. |
| 2011/0143007 A1 | 6/2011 | Stengel |
| 2011/0178288 A1 | 7/2011 | Deleyn |
| 2012/0034366 A1 | 2/2012 | Hoffman |
| 2012/0165290 A1 | 6/2012 | Dijkhuizen et al. |

FOREIGN PATENT DOCUMENTS

| | | |
|---|---|---|
| EP | 0530111 B1 | 6/1999 |
| EP | 0929690 A | 7/1999 |
| EP | 0953578 A2 | 11/1999 |
| EP | 0968231 B1 | 6/2002 |
| FR | 1600591 A | 7/1970 |
| JP | 58170492 A | 10/1983 |
| JP | 61205494 A | 9/1986 |
| JP | 61212296 A | 9/1986 |
| JP | 6416596 A | 1/1989 |
| JP | 01222779 A | 9/1989 |
| JP | 02219584 A | 9/1990 |
| JP | 03133387 A | 6/1991 |
| JP | 0445794 A | 2/1992 |
| JP | 04267886 A | 9/1992 |
| JP | 0538265 A | 2/1993 |
| JP | 2003144187 A | 5/2003 |
| JP | 2003231694 A | 8/2003 |
| WO | 1982/03329 A1 | 10/1982 |
| WO | 9723511 W | 7/1997 |
| WO | 9812342 A1 | 3/1998 |
| WO | 1999004651 A1 | 2/1999 |
| WO | 9928490 W | 6/1999 |
| WO | 2000/015829 A1 | 3/2000 |
| WO | 2005000905 | 1/2005 |
| WO | 2006107802 W | 10/2006 |
| WO | 2006107803 W | 10/2006 |
| WO | 2007/144025 A1 † | 12/2007 |
| WO | 2008085529 A2 | 7/2008 |
| WO | 2009051977 A1 | 4/2009 |
| WO | 2009137839 | 11/2009 |
| WO | 201020321 W | 2/2010 |
| WO | WO-2010020321 A1 | 2/2010 |
| WO | 2010106384 A1 | 9/2010 |
| WO | 2010120661 A1 | 10/2010 |
| WO | 2010125315 A1 | 11/2010 |
| WO | 2011057291 A1 | 5/2011 |
| WO | 2011071179 A1 | 6/2011 |
| WO | 2011095736 A1 | 8/2011 |

OTHER PUBLICATIONS

Kaneko, et al., Digestibility Characteristics of Isomaltooligosaccharides in Comparison with Several Saccharides Using the Rat Jejunum Look Method, Biosci. Biotech. Biochem., 59(7), 1190-1194, 1995.

Katsumi Ajisaka, et al., "The Synthesis of Oligosaccharides by the Reversed Hydrolysis Reaction of ß-Glucosidase at High Substrate Concentration and at High Temperature", Biotechnology Letters, vol. 9, No. 4, 243-248 (1987).

Kazuhiro Ohkuma, et al., "Fibersol-2: a Soluble, Non-digestible, Starch-derived Dietary Fibre", Advanced dietary fibre technology, Chapter 44, 2001—Wiley Online Library, pp. 509-523.

Koch, et al., Action of amylolytic and pullulytic enzymes from various anaerobic thermophiles on linear and branched glucose polymers, Publication: Starke, vol. 42, issue 10, pp. 397-403.

Kohmoto, et al., Metabolism of 13C-Isomaltooligosaccharides in Healthy Men., Biosci. Biotech. Biochem., 56(6), 937-940, 1992.

Peter T. Mora et al., "Synthetic Polysaccharides. I. Polycondensation of Glucose1", Jour. Amer. Chem. Soc., 80, 685-692 (1958).

SciFinder Abstract of "The polycondiensation equilibrium of D-glucose in the presence of hydrochloric acid as catalyst", Frahm, Hermann, Kaiser-Wilhelm Inst. Chem., Berlin-Dahlem, Ann. (1944), 555, 187-213. Journal language unavailable. CAN 41:2187, AN 1947-2187, CAPLUS.

Stuart A.S. Craig, "Polydextrose: Analysis and Physiological Benefits", Advanced Dietary Fibre Technology, Chapter 43, 2001—Wiley Online Library, pp. 503-508.

T. Nakakuki et al., "Oligosaccharides: Production, Properties and Applications", Japanese Technology Reviews, 1993. Gordon and Breach Science Publishers. pp. 335-366.

Takehiro Unno, "Industrial Production of Gentiooligosaccharide-Containing Syrups", Oyo Toshitsu Kagaku, 42, 1, p. 83-89 (1995).

Takehiro Unno, et al., "Industrial Production and Higher Application of Functional ß-Glucooligosaccharides Having a Bitter Taste", J. Appl. Glycosci., 52, 59-64 (2005).

Tsong-Rong Yan, et al., "Synthesis of cello-oligosaccharides from cellobiose with ß-glucosidase II from Aspergillus niger", Biotechnology Letters, vol. 20, No. 6, Jun. 1998, pp. 591-594.

Hardie, David G., and David J. Manners. "A viscometric assay for pullulanase-type, debranching enzymes." Carbohydrate Research 36 (1974): 207-210.

Declaration of William S. York executed Oct. 22, 2012 and submitted in Inter Partes Review of U.S. Pat. No. 3,361,235 (112 pages).

Certified English translation of JP05-38265; already of record.
Certified English translation of JPH04-45794; already of record.
Certified English translation of JPS58-170492; already of record.
Certified English translation of JPS64-016596; already of record.

* cited by examiner
† cited by third party

CARBOHYDRATE COMPOSITIONS

CROSS REFERENCE TO RELATED APPLICATIONS

This application is a national phase entry of International Application No. PCT/US14/030010, filed Mar. 15, 2014, entitled "CARBOHYDRATE COMPOSITIONS", which claims priority to U.S. Patent Application, Ser. No. 61/792,617, filed Mar. 15, 2013, entitled "CARBOHYDRATE COMPOSITIONS", which are hereby incorporated by reference in their entirety.

REFERENCE TO RELATED APPLICATION

This application claims priority to U.S. Provisional Application No. 61/792,617, filed Mar. 15, 2013.

TECHNICAL FIELD

The disclosure relates to carbohydrate compositions having reduced sugar and low digestibility, methods of making the carbohydrate compositions, and food products comprising the carbohydrate compositions.

BACKGROUND

The chemical, physical, and functional properties of sweeteners vary according to their carbohydrate compositions. One form of traditional nutritive sweetener includes starch-derived syrups. With respect to the carbohydrate composition of traditional starch-derived syrups, the sweetener industry typically produces products (i.e., a syrup product obtained from the hydrolysis of starch) containing in the range of from 15% to 99% sugar (glucose or dextrose, fructose and maltose) with the most widely used syrups containing more than 25% sugar (such as, for example, 43 DE and 63 DE corn syrups).

It is known that generally, syrups having carbohydrate compositions less than 25% sugar (such as, for example, 25 DE, 28 DE, and 36 DE corn syrups) are not very sweet and are extremely viscous and thick, making it a processing challenge to use such syrups due to, for example, high resistance to pumping, high resistance to flow, and high adhesiveness to processing equipment. Additionally, traditional starch-derived syrups (e.g. corn syrups) having carbohydrate compositions less than 25% sugar have higher concentrations of polysaccharides (DP16+), which may lead to undesirable properties in certain food applications, e.g. causing foodstuffs to harden more quickly than those having more than 25% sugar and lower concentrations of polysaccharides (DP16+).

However, although traditional starch-derived syrups containing carbohydrate compositions with more than 25% sugar have lower viscosities and lower concentrations of polysaccharides, and thus do not have the same processing challenges as syrups containing carbohydrate compositions with less than 25% sugar, the lower viscosity syrups add sugar levels to foodstuff where such added sugar levels may not be desired. Generally, the carbohydrate compositions found in these traditional nutritive sweeteners are readily digestible in the upper gastrointestinal tract and are absorbed in the body, thus delivering a full 4 kcal/gram on a dry weight basis.

There is, however, a growing consumer demand for food products containing ingredients that are suited particularly to healthier diets, including, by way of example, reduced-sugar and/or lower—digestible ingredients. Likewise, there is an interest in developing food products with these reduced-sugar and/or low-digestible ingredients. However, oftentimes the incorporation of the reduced-sugar and/or low-digestible ingredients can negatively alter the taste, consistency, and/or performance of the food products, making them unpalatable and/or reducing their favorable organoleptic properties. Thus, there is a continuing need to develop a reduced-sugar and/or lower-digestible carbohydrate composition, while retaining qualities similar to those of traditional nutritive sweeteners.

With the aforementioned increased consumer demand for healthier, reduced-sugar, and/or lower-digestible food products, carbohydrate materials such as polydextrose, resistant maltodextrin, and soluble corn fiber have gained popularity in recent years as substitutes for traditional carbohydrates (e.g. glucose or corn syrup or sucrose). Polydextrose, resistant maltodextrin, and soluble corn fiber are reported to be useful in food products to totally or partially replace higher calorie ingredients such as traditional carbohydrates, and to augment artificial sweeteners when replacing sugars. Polydextrose, for example, delivers only 1 kcal/gram, which is about 25% the value of glucose or traditional starch-derived syrups.

When applied to a variety of foods and beverages, however, these reduced-sugar, reduced-calorie carbohydrates are found to lack needed functionalities in certain applications. For example, these reduced-sugar, reduced-calorie carbohydrates have high viscosities due to their high molecular weights. To manage the high viscosity of these reduced-sugar, reduced-calorie carbohydrates, water can be added to dilute these carbohydrates, resulting in higher water activity and thus more susceptibility to microbial contamination. Furthermore, the high molecular weights of these carbohydrates will result in undesired functional outcomes in food products, such as hardening. In addition to their high viscosities and high molecular weights, these reduced-sugar, reduced-calorie carbohydrates, while being less digestible, often have a darker color and off-flavor that have to be removed by additional treatments such as carbon adsorption.

A reduced-sugar, reduced-calorie, and/or low-digestibility carbohydrate composition with desirable molecular characteristics is, therefore, still needed to provide reduced-sugar and/or lower-digestible sweeteners that have desired viscosities, e.g. having satisfactory processing requirements, and desired functionalities, e.g. when used in the production of food and beverage products. In particular, food manufacturers are demanding from its suppliers a reduced-sugar, lower-digestible syrup having a viscosity similar to that of a 43 DE syrup.

DETAILED DESCRIPTION

Figure 1:
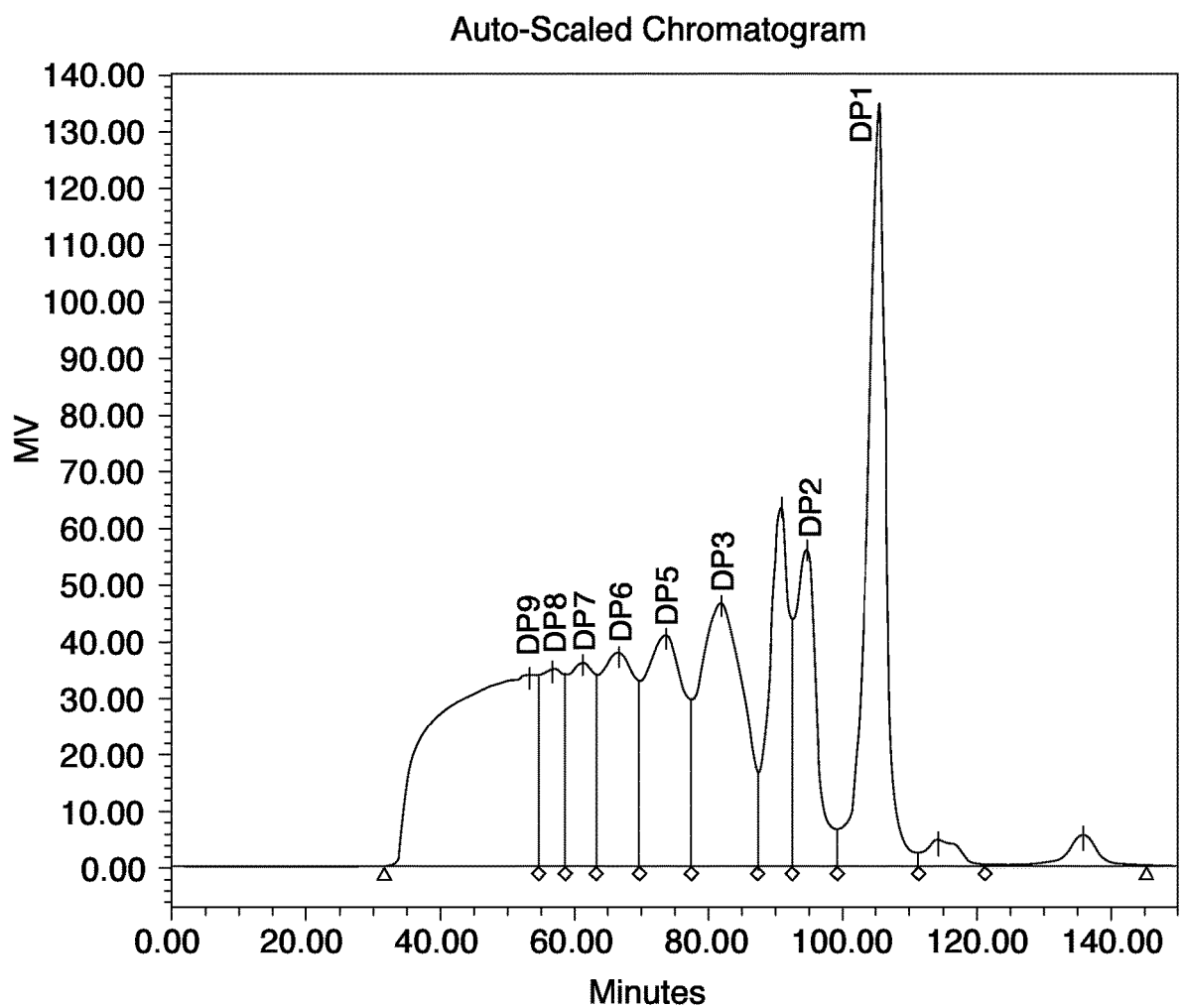
FIG. 1 is a chromatogram of 2A feed from Example 2.
Figure 2:
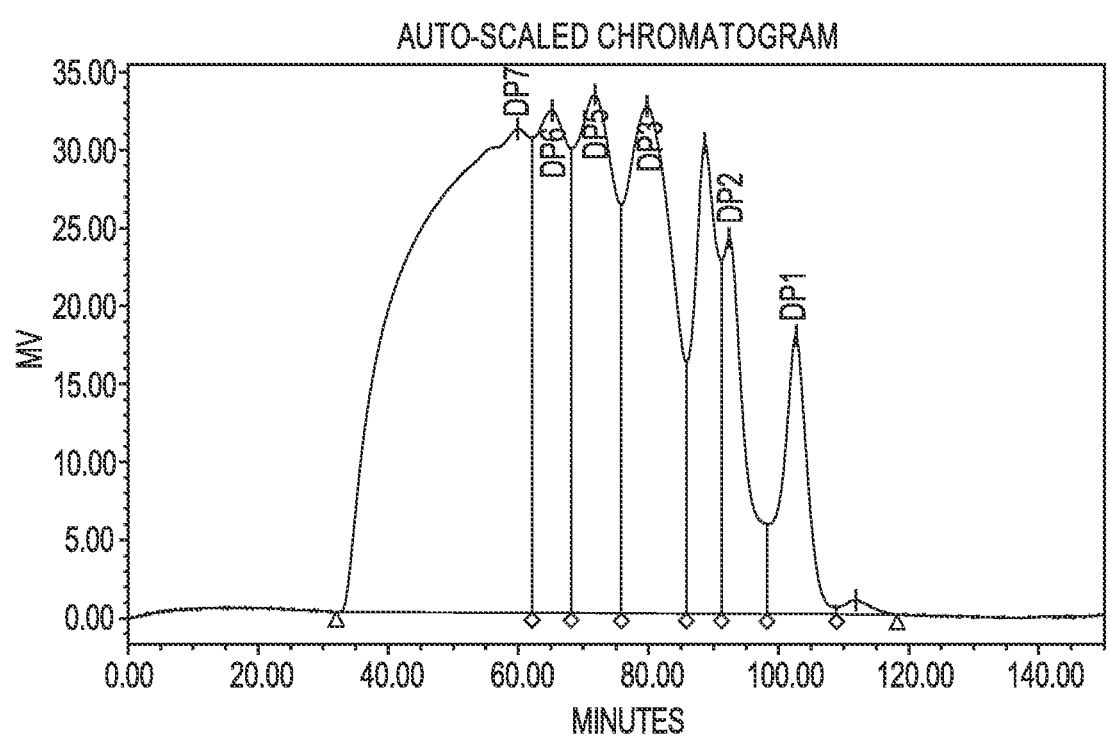
FIG. 2 is a chromatogram of 2A product from Example 2, Table 4.

Unless otherwise defined, all technical and scientific terms used herein have the same meaning as commonly understood by one of ordinary skill in the art to which this disclosure belongs.

The term "digestibility", as used herein, refers to the digestion of the carbohydrate composition in the upper gastrointestinal tract that is absorbed into the body and, therefore, impacting a body's glycemic index. Thus, the terms "low-digestibility" or "lower-digestibility" and variations thereof are intended to mean ingredients in food products that are resistant, either partially or completely, to digestion in the upper gastrointestinal tract. These ingredients may be fermented or partially fermented in the large intestine. Lower-digestible ingredients may, in certain embodiments of the disclosure, offer one or more of the following health benefits: reduced caloric content; reduced or no effect on blood glucose levels; reduced cariogenic effect; modulation of the metabolism of triglycerides; reduced cholesterol; and improved gastric emptying. The terms "low-digestibility" or "lower-digestibility", used interchangeably herein, imply reduced calorie. The digestibility of the carbohydrate compositions described herein may be determined by an in vitro enzymatic treatment ("Enzymatic Digestibility Assay"), described below (Example 1).

It is to be understood that, as used throughout the disclosure with respect to the inventive compositions, when the terms "reduced-sugar" and "lower-digestibility", as well as variations thereof, are recited, each instance is intended to represent "reduced-sugar and/or lower-digestibility", regardless of whether or not so stated unless specifically indicated otherwise.

The term "DP-N", as used herein, refers to the degree of polymerization, where N is the number of monomeric units (e.g., glucose or dextrose units) in the saccharide, reflecting the composition of the carbohydrate. For example, DP1 is a saccharide with one monomeric unit (monosaccharide), and DP2 is a saccharide with two monomeric units (disaccharide). DP-N is expressed as a weight percent of an individual saccharide on a total carbohydrate (also referred to interchangeably herein as "saccharide") dry weight basis.

As used herein, when N represents a range, it is intended to indicate the total of all saccharides within the range. For example, DP3-7 is intended to indicate the total of all DP3 through DP7 saccharides, and DP16+ is intended to indicate the total of all saccharides DP16 and greater.

As used herein, the term "foodstuff" is intended to mean any substance suitable for consumption as food by humans and/or animals, e.g. any food and/or beverage product. Throughout the disclosure, the terms "foodstuff" and "food product" are used interchangeably.

The term "linkage", as used herein, refers to a covalent C-glycosyl bond that joins a saccharide molecule to another saccharide molecule. Both α- and β-glycosidic bonds are referred to as "linkages" as used herein. For example, a 1,6-linkage can be either an α-1,6-glycosidic bond or a β-1,6-glycosidic bond that links one glucose at C-1 position with another glucose at C-6 position. Similarly, 1,4-linkage, 1,2-linkage, 1,3-linkage or 4,6-linkage include both α- and β-glycosidic bonds. In the carbohydrate compositions according to the disclosure, one saccharide molecule may join more than one other saccharide molecule through more than one linkages.

As used herein, "PDI" refers to polydispersity index, which indicates the molecular weight distribution of the polymers in the carbohydrate composition. As used herein, "$M_n$" refers to the number average molecular weight, which is the average molecular weight of all components in the carbohydrate composition, and "$M_w$" refers to the weight average molecular weight.

As used herein, the term "traditional starch-derived carbohydrate compositions", "traditional starch-derived carbohydrates", and variations thereof, which may be used interchangeably herein, are meant to include starch-derived carbohydrates prepared by traditional means, such as acid-acid, acid-enzyme, or enzyme-enzyme conversion methods, and having about 1-99DE (dextrose equivalents), such as about 1-20DE, about 20-50DE, 25-99DE or about 65-95DE. The traditional starch-derived carbohydrates may, in various exemplary embodiments, be starch products, dextrin products, maltodextrin products, glucose products, or dextrose products. The compositions comprising the traditional starch-derived carbohydrate may, in at least certain exemplary embodiments, be aqueous (or syrup).

The term "oligosaccharide", as used herein, refers to a carbohydrate with a DP of from at least 3 to at most 15. Thus, DP3-6, DP3-10, DP4-5, and DP11-15 are all examples of oligosaccharides. The term "lower oligosaccharide" is intended to mean oligosaccharides on the lower end of DP3-15, including, for example, DP3-10 or DP3-5. The term "higher oligosaccharide" is intended to mean oligosaccharides on the higher end of DP3-15, including for example DP11-15, DP12-15, DP13-15, DP14-15, and DP15.

The term, "polysaccharide", as used herein, refers to a carbohydrate with a DP of at least 16. Thus, DP16+, DP16-20, DP21-30, DP31-40, DP41-50, DP51-100, DP101-150, DP 151-250, and DP251-500 are all examples of polysaccharides.

As used herein, when the carbohydrate is referred to as having a DP of at least 3, at least 4, at least 5, at least 6, at least 7, at least 8, at least 9, at least 10, at least 11, at least 12, at least 13, at least 14, or at least 15, for example, the carbohydrate is characterized as having both oligosaccharides and polysaccharides. Thus, for example, if a carbohydrate composition has less than 35% DP11+, the carbohydrate composition has less than about 35% oligosaccharides and polysaccharides on a dry weight basis with a degree of polymerization of at least 11.

It is understood that, typically, sweetness of a saccharide decreases as DP increases, and vice versa. It is also understood that, typically, viscosity of a saccharide solution increases as DP increases, and vice versa.

The term, "sugar", as used herein, refers to a nutritive carbohydrate sweetener consisting of specific monosaccharides (i.e., glucose, fructose, and galactose) and/or specific disaccharides (i.e., maltose, sucrose, and lactose).

The term "DS", as used herein, refers to the percent dry solids as determined by refractive index and using the computer program, Refractive Index Dry Substance (RI-DS), Standard Analytical Method E-54, Corn Refiners Association, $6^{th}$ Edition, 1977, E-54, pp. 1-11.

The term "viscosity", as used herein, refers to the resistance of a fluid to flow. The viscosity of an aqueous solution, such as a syrup, may be affected by temperature and solids concentration, for example. Viscosity is expressed in terms of centipoise (cPs) at a given temperature and a given % DS.

As described herein, the disclosure relates to methods of making lower-digestible carbohydrate compositions. Various embodiments described provide for compositions comprising reduced sugar levels, while managing the formation of polysaccharides by using a two-step process, including (i) a first treatment process step, and (ii) a second separation step, that, when combined in a particular manner, produce carbohydrate compositions with characteristics of reduced-sugar and lower-digestibility, while minimizing levels of higher oligosaccharides and polysaccharides.

Further, the disclosure relates to unique carbohydrate compositions having reduced-sugar content and/or lower-digestibility than known carbohydrate composition. The unique carbohydrate compositions according to the disclosure possess unique molecular weight profiles that may result in advantageous physical (e.g., improved viscosity) and functional properties (e.g., reduced hardening). The unique carbohydrate compositions of the present disclosure have physical properties and functional properties different from existing reduced-sugar, reduced-calorie carbohydrates such as polydextrose (e.g., Litesse® polydextrose), resistant dextrins and maltodextrin (e.g., Nutriose® resistant dextrin and Fibersol-2® resistant maltodextrin), and soluble corn fibers (e.g., Promitor™ soluble corn fiber).

Additionally, the disclosure relates to food and/or beverage products comprising the unique carbohydrate compositions.

Methods of Making the Carbohydrate Compositions

Methods according to various embodiments of the disclosure relate to processes comprising (i) a first treatment step comprising treating a saccharide to produce a reduced-sugar and lower-digestibility intermediate composition, followed by (ii) a second separation step comprising separating the desirable portion of the intermediate composition. According to various embodiments, the methods described herein produce a final product with a carbohydrate composition having desired physical and/or functional properties.

Treatment Step

One objective of the first step in the process is to treat a saccharide in such a manner as to produce an intermediate composition with lower-digestibility and reduced-sugar content, while avoiding or minimizing the formation of higher-oligosaccharide and polysaccharide content. In at least certain exemplary embodiments, the treatment process maximizes the content of lower oligosaccharides (e.g., the DP3-4, DP3-5, and DP5 concentration) in the intermediate composition to produce a final carbohydrate composition with the desired functional and physical properties.

According to various exemplary embodiments, the treatment step comprises contacting a saccharide feedstock (i.e., starting material) with at least one catalyst to obtain a feed composition. Simultaneously or subsequently, the feed composition is treated by being subjected to elevated temperature, and optionally reduced pressures, to promote polycondensation polymerization. In at least certain embodiments, carefully controlling the time, temperature, and/or pressure allows water levels to be reduced or removed, as needed, to promote the desired degree of polymerization. The treatment of the feed composition as described herein may, for example, be carried out in a vessel.

The treatment of the feed composition may be controlled in order to obtain an intermediate carbohydrate composition having specified characteristics, for example a particular molecular weight distribution of specific saccharides, a particular digestibility, a particular viscosity, a particular $M_n$, $M_w$, and/or PDI.

By way of non-limiting example only, the treatment of the feed composition may be controlled in order to produce an intermediate composition having a digestibility ranging up to about 95%, such as about 10-90%, or about 30-60%; and/or a viscosity ranging from about 300-8000 cPs, such as about 400-7800 cPs, or about 700-3000 cPs (measured at 75% DS; 38° C.).

In further exemplary embodiments, the treatment of the feed composition may be controlled in order to obtain an intermediate carbohydrate composition having a $M_n$ ranging from about 200-1200 Da, such as about 400-700 Da; a $M_w$ ranging from about 300-3200 Da, such as about 700-1500 Da; and/or a PDI ranging from about 1.2-3.5, such as about 1.5-3.3, or about 1.75-2.15.

Further, the treatment of the feed composition may be controlled in a manner to produce an intermediate composition comprising, on a dry weight basis, an amount of DP1+2 ranging from about 10-85%, such as about 20-70%, about 30-50%, about 35-45%, or about 38-42%; an amount of DP2s ranging from about 3-30%, such as about 5-26%, or about 10-24%; an amount of DP3-5 ranging from about 5-30%, such as about 7-28%, or about 10-25%; an amount of DP3+ ranging from about 50-70%, such as about 55-65%, or about 58-62%; and an amount of DP6+ ranging from about 8-65%, such as about 10-55%. In at least certain preferred embodiments, the intermediate composition according to the disclosure comprises an amount of DP1+2 ranging from about 18-63%, such as about 20-60%, or about 24-56%; an amount of DP2s ranging from about 10-25%, such as about 12-24%; an amount of DP3-5 ranging from about 25-30%, such as about 27-29%; an amount of DP3+ ranging from about 40-80%, such as about 42-78%, or about 44-76%; and an amount of DP6+ ranging from about 15-50%, such as about 17-48%.

In further exemplary embodiments, the treatment of the feed composition may be controlled in order to obtain an intermediate carbohydrate composition having a ratio of DP5/DP2s in the range of about 0.401.0, such as about 0.40-0.90, such as about 0.40-0.85 or about 0.45-0.75; and a ratio of DP3-5/DP2s in the range of about 1.0-2.5, such as about 1.1-2.4, or about 1.15-2.25. Further, the treatment of the feed composition may be controlled in order to obtain an intermediate carbohydrate composition having a ratio of DP5/DP1+2 up to about 0.60, such as about 0.10-0.50, about 0.10-0.45, or about 0.15-0.40; and a ratio of DP3-5/DP1+2 in the range of about 0.25-1.50, such as about 0.50-1.30.

By way of further non-limiting example, the treatment of the feed composition may be controlled to produce an intermediate carbohydrate composition comprising, on a dry weight basis, greater than about 40% DP3+, such as about 44-75% DP3+; and less than about 15% DP16+, such as about 1-14% DP16+. By way of yet a further non-limiting example, the treatment of the feed composition may be controlled to produce an intermediate carbohydrate composition comprising, on a dry weight basis less than about 15% DP16+, such as less than about 7%, such as less than about 3%, and such as less than about 1% DP16+. In contrast, conventional, known treatments of feed compositions typically produce compositions having much lower sugar levels, while also forming much higher levels of polysaccharides as compared to the present disclosure, such as greater than about 17% polysaccharides with DP16+ on a dry weight basis.

The desired molecular weight distribution of lower digestible oligosaccharides and polysaccharides can be achieved by controlling parameters in the processes according to the disclosure, such as, for example, time, temperature, type and concentration of saccharide, type and concentration of catalyst, ratio of the saccharide to catalyst, concentrations of cationic and anionic compounds (e.g., minerals), pH, pressure, and water concentration.

According to one exemplary and non-limiting embodiment, the progress of the treatment step in producing an intermediate composition having a particular molecular weight distribution of oligosaccharides and polysaccharides may be monitored by in-process analytical methods, for example in-line and/or off-line chromatography (e.g. HPLC), or infrared spectroscopy (e.g. FTNIR) that provide data regarding the content of the intermediate composition.

In yet further exemplary embodiments, the progress of the treatment step may be monitored by monitoring the viscosity of the reaction mixture during the treatment process, and terminating the process when a pre-determined viscosity is reached. The viscosity of the composition inside the treatment vessel will be sensitive to the amount of oligosaccharides and polysaccharides produced (i.e., DP3+), with viscosity increasing as the amount of oligosaccharides and polysaccharides increase. Those skilled in the art can use any technique known to those of skill in the art to monitor viscosity during the treatment, including but not limited to monitoring motor amps from a vessel agitator, monitoring motor amps on a re-circulation pump, and using in-line viscometers.

In yet further exemplary embodiments, one of skill in the art may monitor the progress of the treatment step (such as by the methods described above) and then correlate those results with treatment time as a function of other treatment step parameters (e.g., the saccharide used, temperature, catalyst level). In other words, once these correlations are available for the specified treatment vessel and treatment parameters, one of skill in the art will be able to reproduce the process in order to prepare an intermediate composition having desired distribution of monosaccharides, disaccharides, oligosaccharides and polysaccharides by selecting suitable treatment times and parameters to reproduce the intermediate composition in a controlled manner.

The process to obtain the intermediate composition described herein limits the formation of high levels of higher oligosaccharides and polysaccharides, and thus surprisingly enables the final carbohydrate composition with desirable physical and functional properties of the present disclosure. The controlled treatment of the feed composition also limits the formation of color and off-flavor in the intermediate composition, thus contributing to the lighter color and less off-flavor of the final carbohydrate compositions according to the present disclosure relative to commercially available reduced-sugar, reduced-calorie ingredients such as Litesse® polydextrose and Promitor™ soluble corn fiber. These benefits may, in at least certain embodiments, lead to reduced production costs by eliminating costs associated with additional steps to lighten the color and/or improve the flavor, such as may be required with known processes.

According to various embodiments, the treatment process may comprise steps of providing a saccharide feedstock having a desired % DS, and adding a catalyst to produce a feed composition. Further steps of providing the feed composition into a reaction vessel and then applying vacuum pressure and heating for a period of time, until a desired viscosity is reached. It should be noted, however, that one or more step of the treatment process may be omitted, or additional steps may be added, according to various exemplary embodiments. By way of example only, the treatment process may begin with a feed composition wherein the feedstock and catalyst are already mixed; a step of applying vacuum pressure may be omitted; or a conventional evaporation step may be added.

As an example of a treatment process contemplated for preparing an intermediate composition according to the disclosure, a feed composition may be prepared by adding concentrated sulfuric acid or hydrochloric acid to a feedstock chosen from 95% dextrose having 65% DS in an amount sufficient to produce a concentration of 30-40 ppm. The feed composition may then be added to a reaction vessel and heated under 20 inches Hg vacuum to a temperature ranging from about 120-180° C. for about 20-60 minutes.

As a further example of a treatment process contemplated for preparing an intermediate composition according to the disclosure, a feed composition may be prepared by adding concentrated sulfuric acid to a feedstock chosen from 95% dextrose having 65% DS, in an amount sufficient to produce a concentration of 200 ppm. The feed composition may then be added to a reaction vessel and heated under 20 inches Hg vacuum to a temperature ranging from about 132-144° C. for about 20 minutes, after which the vacuum may be broken and the heating continued for an additional 15-45 minutes under atmospheric pressure.

As yet a further example of a treatment process contemplated for preparing an intermediate composition according to the disclosure, a feed composition may be prepared by adding concentrated sulfuric acid to a feedstock chosen from 95% dextrose having 71% DS, in an amount sufficient to produce a concentration of 200 ppm. The feed composition may then be provided to an evaporator and any conventional evaporation technique used for a period of time sufficient to produce a composition having about 80-90% DS, after which the composition may be heated, optionally under 20 inches Hg vacuum, to a temperature ranging from about 120-180° C. for about 20-60 minutes.

It is within the ability of those skilled in the art to choose the appropriate parameters for the treatment process. As one of skill in the art will appreciate, the appropriate parameters may vary depending on a variety of factors, such as, for example, the reaction vessel chosen.

For example, any combination of heating temperatures and times may be chosen to prepare an intermediate carbohydrate composition according to various embodiments of the disclosure, so long as the intermediate composition prepared comprises the desired concentration and distribution of saccharides. By way of non-limiting example only, the feed composition may be heated to a temperature range of about 50 to 350° C. or about 50 to 250° C., such as, for example, about 80 to 210° C., about 90 to 180° C., about 100 to 180° C., about 110 to 180° C., about 120 to 180° C., about 125 to 140° C., about 125 to 135° C., about 125 to 130° C., about 130 to 140° C., about 130 to 135° C., about 135 to 140° C., or about 100 to 200° C. For example, in certain preferred embodiments, the saccharide may be heated with a catalyst to a temperature range of about 120° C. to about 180° C., such as about 140° C. to about 170° C., or about 143° C. to about 166° C., such as about 155° C.

In at least certain exemplary embodiments, it may be desirable to heat the feed composition to one temperature for one period of time, and then to a second, different temperature, for a second period of time, and so on for any number of periods of time. In further embodiments, the feed composition may be heated to about the specified temperature or temperature range for the entire treatment time.

According to various exemplary embodiments, the treatment time can range from about 5 seconds to about 5 days, depending on how the parameters cited herein are controlled. By way of non-limiting example only, the treatment time can range up to about 24 hours, such as up to about 12 hours, up to about 6 hours, or up to about 2 hours. In further exemplary embodiments, the treatment time can range from about 15 minutes to about 2 hours, such as about 30 minutes to about 2 hours, about 30 minutes to about 1 hour, about 20 minutes to about an hour, or about 15 minutes to about 1 hour. For example, in certain preferred embodiments, the treatment time can range from about 20 to about 30 minutes, about 30 to about 50 minutes, or about 45 to about 60 minutes. From a commercial production standpoint, it may be preferable to minimize treatment time thus keeping production of the carbohydrate compositions of the present disclosure more economical.

Furthermore, according to various exemplary embodiments, the feedstock may be chosen from at least one saccharide, in any form, such as, for example, solid form or as an aqueous solution. In the case where the at least one saccharide is provided as an aqueous solution, in various embodiments the concentration of DS can range up to about 99%, such as, for example, up to about 95%, up to about 90%, up to about 85%, up to about 80%, up to about 75%, up to about 70%, or up to about 65%. In further exemplary embodiments, the concentration of DS may range from about 30% to about 95%, such as about 35% to about 95%, about 35% to about 90%, about 40% to about 90%, or about 45% to about 90%. In yet further exemplary embodiments, the concentration of DS may range from about 25 to 75%, such as about 35 to 65%, or about 30 to 71%. In yet a further exemplary embodiment, the concentration of DS of the feedstock may range from at least 65%, such as about 65 to 75%. In various further exemplary embodiments, the concentration of DS may be about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%, with the understanding that each of these numbers may represent an endpoint for either a low-end or high-end of any subrange between about 5% and about 95%. In at least certain preferred embodiments, the concentration of DS may range from at least 65%, such as at least 70%, at least 75%, at least 80%, at least 85%, at least 90%, or at least 95%. In at least certain preferred embodiments, the concentration of DS in the feedstock may range from about 70% to about 95%, such as about 80% to about 90%.

Exemplary saccharides for use as a starting material include, but are not limited to, a monosaccharide, a disaccharide, an oligosaccharide, and other starch hydrolysates (i.e., derived from the hydrolysis of starch), for example and without limitation, a glucose syrup, a corn syrup, and mixtures thereof. In various embodiments, starting materials may be chosen from any and all ranges of dextrose equivalent syrups may be chosen as a starting material. Thus, in various embodiments, starting materials may be chosen from 20-99DE syrups. A preferred exemplary embodiment of the starting material is dextrose or a dextrose syrup. In at least one exemplary embodiment, the saccharide may be chosen from 95% dextrose corn syrup.

A saccharide can also be combined with a polyol, such as and without limitation, sorbitol, glycerol, erthritol, xylitol, mannitol, and galactitol, and mixtures thereof. During the treatment step, the polyol may be incorporated into the low digestibility oligosaccharides and polysaccharides of the intermediate composition. The saccharide for the feedstock may also be chosen from any mixture of saccharides. As one of skill in the art will appreciate, there may be small amount of other components present in the saccharide starting materials, such as, for example, proteins, ash, fat, vitamins, and minerals. However, any additional component that does not substantially interfere with the process may be present in the starting material.

According to various exemplary and non-limiting embodiments, the at least one catalyst may be chosen from any alkaline or acidic catalyst, catalytic resin, metal catalyst, and any activated catalytic media. According to at least one exemplary embodiment, the catalyst is not an enzyme. Those skilled in the art will be able to choose an appropriate catalyst for use in the treatment process described herein. By way of example only, acidic catalysts useful according to various embodiments of the disclosure include organic acids and anhydrides thereof, and inorganic acids. The acid catalysts can be homogeneous acid catalysts or heterogeneous acid catalysts.

Organic acids useful according to various embodiments of the disclosure include, but are not limited to, adipic acid, acetic acid, citric acid, fumaric acid, gluconic acid, itaconic acid, lactic acid, maleic acid, malic acid, succinic acid, tartaric acids, terephthalic acids, and mixtures thereof.

By way of example, in at least certain preferred embodiments when the catalyst is chosen from organic acids, the catalyst may be present in an amount ranging from about 0.01% to about 5% by weight, such as about 0.1% to about 3% by weight, about 0.5% to about 2%, or about 1% to about 1.5%.

Inorganic acids useful according to various embodiments of the disclosure include, but are not limited to, hydrochloric acid, sulfuric acid, sulfurous acid, thiosulfuric acid, dithionic acid, pyrosulfuric acid, selenic acid, selenious acid, nitric acid, phosphoric acid, phosphorous acid, hypophosphorous acid, pyrophosphoric acid, polyphosphoric acid, hypophosphoric acid, boric acid, perchloric acid, hypochlorous acid, hydrobromic acid, hydriodic acid and silicic acid, acidic alkali metal or alkaline earth metal salts of the above inorganic acids, and mixtures thereof. In at least certain preferred embodiments, the catalyst may be chosen from sulfuric acid and hydrochloric acid.

By way of example, in at least certain preferred embodiments when the catalyst is chosen from inorganic acids, the catalyst may be added to produce a concentration ranging up to about 1250 ppm, such as up to about 1000 ppm, up to about 750 ppm, up to about 500 ppm, or up to about 250 ppm. In at least certain preferred embodiments, the inorganic acids may be present in an amount to produce a concentration in the range of about 20 to about 1000 ppm, or about 30 to about 500 ppm.

In embodiments where solid catalytic media is employed, e.g. catalytic resins, metal catalysts, and any type of activated catalytic media, one of skill in the art will be able to choose the appropriate type of catalytic media and method, such as, for example, a column packed with activated carbon, through which the saccharide feedstock may be pumped.

The saccharide feedstock, which may have a pH in the range of about 3.0 to about 6.0, may be treated with at least one inorganic acid, at least one organic acid, or mixtures thereof, in an amount sufficient to adjust the pH of the feed composition to a desired pH or pH range. It is within the ability of those skilled in the art to determine how much of any particular acid to add to the composition, in order to achieve the desired pH. The pH of the feed composition may, in various exemplary embodiments, be within a range of up to about 4.0, such as, up to about 3.0, or up to about 2.0, such as for example, about 1.2-1.9, about 1.2-1.6, or about 1.5-1.9. In various embodiments, the pH of the feed composition may be about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0. In at least certain preferred embodiments, the pH of the feed composition ranges from about 1.0 to about 2.5.

Optionally, at least one oxidizing agent may also be present in the feed composition. Oxidizing agents useful according to various embodiments of the disclosure include, but are not limited to, peroxides and peroxy acids. In one exemplary embodiment, the oxidizing agent may be chosen from hydrogen peroxide, organic peroxyacids, such as peracetic acid, performic acid and inorganic peroxyacids, such as peroxysulfutic acid. The oxidizing agent may be added in any amount.

As described herein, a further, optional step in the treatment process for preparing an intermediate carbohydrate composition according to the disclosure comprises treating the feed composition by subjecting the composition to reduced pressure, by any method known, such as, for example, by vacuum. Optionally, the reduced pressure, such as vacuum, may be applied for all or part of the treatment process step. The reduced pressure that the composition may be subjected to may range up to about 29 inch Hg vacuum, such as, for example, up to about 26.5 inch Hg vacuum. For example, the reduced pressure may range from about 5-29 inch Hg vacuum, such as about 10-26 inch Hg vacuum or about 15-26.5 inch Hg vacuum. In at least certain preferred embodiments, the reduced pressure may be in the range of about 18 to about 22 inch Hg vacuum, such as about 20 inch Hg vacuum. The step of subjecting the composition to reduced pressure may be carried out alone or in any combination with any of the other steps described for the treatment process.

It is another advantage of certain embodiments of the invention that, for example because the amounts of catalyst consumed are low and the catalyst is inexpensive, the overall process is economical and provides oligosaccharides and polysaccharides that do not require extensive purification procedures.

It is to be understood that, in various exemplary embodiments according to the disclosure, the saccharide feedstock may be combined with the at least one catalyst either sequentially or simultaneously with other processing parameters of the treatment step. By way of non-limiting example only, a saccharide may be treated with heat and/or pressure and subsequently contacted with a catalyst. As yet a further non-limiting example, an aqueous saccharide composition may be treated with at least one acid, and either simultaneously or subsequently treating the aqueous feed composition with heat and/or reduced pressure. As a further non-limiting example, an aqueous saccharide composition may be treated with at least one organic acid and at least one oxidizing agent, and either simultaneously or subsequently treated with heat and/or reduced pressure. As yet a further non-limiting example, an aqueous saccharide feedstock may be treated by adjusting the pH of the aqueous feedstock and then the pH-adjusted composition may have both at least one oxidizing agent and at least one organic acid added in a further treatment step, and either simultaneously or subsequently treated with heat and/or reduced pressure. As yet a further non-limiting example, a saccharide and a catalyst may be pre-blended and then simultaneously treated with heat and/or reduced pressure.

According to various embodiments, once the intermediate composition is produced, further processing steps may be undertaken. For example, water, such as deionized water, may be added in any amount. It may, in certain embodiments, be desirable to add an amount of water sufficient to produce an intermediate composition comprising about 5-85% DS, such as about 25-80% DS, about 40-80% DS, about 25-70%, about 40-60%, or about 50-60% DS, the concentration depending on the selected separation step, as discussed below. In various exemplary embodiments, an amount of water sufficient to prepare an intermediate composition comprising about 30%, 35%, about 40%, about 45%, about 50%, about 55%, about 60%, about 65%, about 70%, about 75%, or about 80% DS may be added. In at least certain preferred embodiments, the intermediate composition may comprise about 60% DS.

Separation Step

Once the intermediate composition, e.g. comprising about 30% to about 80% DS, such as about 60% DS, is produced, the solution containing the intermediate composition is then separated by any known separation process to produce at least two carbohydrate composition streams. In a two-stream embodiment, for example, a first stream is rich in DP1+2, relative to a second stream comprising the carbohydrate composition of the current disclosure. In various embodiments, the streams may be separated in order to produce a first stream comprising a carbohydrate composition comprising from about 30 to about 100%, such as from about 40 to about 100%, from about 50 to about 100%, or from about 60 to about 100%, DP1+2 on a dry weight basis, and a second stream comprising less than about 30%, such as less than about 25% DP1+2 on a dry weight basis, such as less than about 20%; an amount of DP3-5 in the range of from about 20 to about 50%, such as from about 23 to about 45%, from about 30 to about 40%, or from about 35 to about 37%, such as about 36%, on a dry weight basis; an amount of DP6+ in the range of from about 35% to about 71%, such as from about 36% to about 65%, or from about 40% to about 65%, such as about 40% to about 60%, on a dry weight basis; an amount of DP11+ less than about 40% or less than about 38%, such as in the range of from about 5% to about 38%, such as from about 20% to about 32%, on a dry weight basis; and/or an amount of DP16+ less than about 17%, such as in the range of from about 0.01% to about 16%, on a dry weight basis. The second stream thus comprises a reduced-sugar, lower-digestibility carbohydrate composition with desirable physical and functional properties, such as described below.

The separation process can be accomplished by any known method, such as, for example, chromatographic fractionation, membrane filtration, nanofiltration, dialysis, preferential precipitation using solvents, etc., as well as any combination of these methods. It is within the ability of those skilled in the art to choose the appropriate separation method to obtain the first and second streams according to various embodiments of the disclosure. The separation process is controlled to remove (via a first stream) certain amounts of DP1 and DP2, and optionally additional oligosaccharides, from the solution comprising the intermediate composition, so that a resulting second stream contains a reduced-sugar, lower-digestibility carbohydrate composition with the intended physical and functional properties.

According to at least various exemplary embodiments, the first stream may optionally be recycled to the vessel containing the feed composition, and further subjected to the treatment process in order to produce more of the intermediate composition as described above.

Alternatively, once the intermediate composition is prepared and made to an aqueous solution of from about 10% DS to about 40% DS according to various embodiments of this disclosure, the solution containing the intermediate composition may then be subjected to a biological treatment, such as, for example yeast fermentation, that utilizes DP1 and DP2 components in the intermediate composition, resulting in a stream that contains a reduced-sugar, lower-digestibility carbohydrate composition with the intended physical and functional properties.

Further processing steps of the streams produced by separation or a biological treatment, such as any steps known to those of skill in the art, may, optionally, be undertaken. Such steps include, for example, further refining and evaporation or drying steps.

Those skilled in the art will, from the disclosure herein, be able to ascertain the numerous permutations of treatment and/or separation steps possible, and the examples provided in the Detailed Description and Examples sections herein should not be construed as limiting of the permutations possible according to the disclosure.

It should be noted that, according to various embodiments of the disclosure, it would be possible for the skilled artisan to prepare a carbohydrate composition as described herein by obtaining an intermediate composition having the properties described, and implementing the separation step at some subsequent point in time. In other words, methods of preparing carbohydrate compositions according to the disclosure do not require that the treatment and separation steps be performed in immediate sequence or by the same actor.

Carbohydrate Compositions

When the disclosed processes are carried out, the second stream comprises a carbohydrate composition which exhibits reduced sugar content and lower digestibility relative to traditional nutritive sweeteners, such as, for example sucrose, high fructose corn syrup, and corn syrup.

The carbohydrate compositions may, according to various embodiments, comprise an amount of DP1+2 of less than about 30%, such as, for example, less than about 25%, less than about 20%, or less than about 15%. In at least one preferred embodiment, the amount of DP1+2 in the carbohydrate composition ranges from about 5% to about 15%.

The carbohydrate composition may, according to various embodiments, comprise an amount of total DP3-5 greater than about 20%, such as, for example, greater than about 25%, greater than about 30%, greater than about 35%, greater than about 40%, or greater than about 45%. In at least one preferred embodiment, the amount of DP3-5 ranges from about 20% to about 50%. In further embodiments, the carbohydrate composition may comprise an amount of DP3-4 in an amount up to about 25%, such as up to about 22%, for example in the range of about 8% to about 25%, or about 10% to about 22%. In a further preferred embodiment, the amount of DP3-6 ranges from about 25% to about 60%, such as about 30% to about 55%.

In various embodiments, the carbohydrate compositions prepared according to the disclosure may comprise a ratio of (DP3-5)/DP6+ greater than about 0.25, such as, for example, greater than about 0.3, greater than about 0.4, greater than about 0.5, greater than about 0.6, greater than about 0.7, greater than about 0.8, greater than about 0.9, greater than about 1.0, greater than about 1.1, greater than about 1.2, greater than about 1.3, or greater than about 1.4. In at least one preferred embodiment, the ratio of (DP3-5)/DP6+ is in the range of about 0.3 to about 1.5. In further embodiments, the carbohydrate compositions may comprise a ratio of (DP3-4)/DP6+ greater than about 0.1, such as greater than about 0.2, greater than about 0.3, greater than about 0.4, greater than about 0.5, for example about 0.1 to about 0.75, or about 0.15 to about 0.70. In yet further embodiments, the carbohydrate compositions may comprise a ratio of (DP3-6)/DP6+ greater than about 0.5, such as greater than about 0.6, greater than about 0.7, greater than about 0.8, greater than about 0.9, greater than about 1.0, greater than about 1.1, greater than about 1.2, or greater than about 1.3, for example about 0.5 to about 1.4.

Furthermore, the carbohydrate compositions according to the disclosure have a surprisingly lower PDI. The PDI of the disclosed carbohydrate compositions is generally less than about 2, such as less than about 1.95, less than about 1.90, less than about 1.85, less than about 1.80, less than about 1.75, less than about 1.70, less than about 1.65, less than about 1.60, less than about 1.55, less than about 1.50, less than about 1.45, less than about 1.40, less than about 1.35, less than about 1.30, less than about 1.25, or less than about 1.20. In at least certain preferred embodiments, the PDI of the carbohydrate compositions may range from about 1.0 to about 2.0, such as about 1.1 to about 1.9, about 1.1 to about 1.8, about 1.2 to about 1.8, about 1.3 to about 1.8, or about 1.4 to about 1.8.

The carbohydrate compositions according to the present disclosure exhibit lower PDI in combination with a lower mass average and lower number average molecular weight, relative to reduced-sugar, reduced-calorie carbohydrates such as Litesse® polydextrose and Promitor™ soluble corn fiber. Without wishing to be bound, it is believed that this combination provides carbohydrate compositions having a surprisingly reduced viscosity relative to low DE corn syrups (e.g. 25 DE and 28 DE). In some embodiments, the carbohydrate compositions have a surprisingly reduced viscosity relative to commercially available reduced-sugar, reduced-calorie ingredients such as Litesse® polydextrose and Promitor™ soluble corn fiber.

In various embodiments, the carbohydrate composition may comprise a combination of a PDI less than about 2, such as less than about 1.95, less than about 1.9, less than about 1.85, or less than about 1.8, such as from about 1.3 to about 1.8; a $M_w$ of less than about 2000, such as less than about 1900, less than about 1800, less than about 1700 less than about 1600, less than about 1500, less than about 1400, or less than about 1300, such as from about 500 to about 2000 or about 900 to about 1700; and a $M_n$ of less than about 1200, such as less than about 1150, less than about 1100, less than about 1050, less than about 1000, less than about 950, less than about 900, less than about 850, less than about 800, less than about 750, less than about 700, or less than about 650, such as from about 600 to about 1150; as well as any and all combinations of PDI, $M_w$, and $M_n$ thereof. In at least one preferred embodiment, the carbohydrate compositions may comprise a PDI ranging from about 1.3 to about 1.8; a $M_w$ ranging from about 900 to about 1700; and a $M_n$ ranging from about 600 to about 1150. In yet another preferred embodiment, the carbohydrate compositions may comprise a PDI of about 1.5; a $M_w$ of about 1650; and a $M_n$ of about 1150. In yet a further preferred embodiment, the carbohydrate compositions may comprise a PDI of about 1.4; a $M_w$ of about 1050; and a $M_n$ of about 750.

In various embodiments, the carbohydrate compositions prepared according to the disclosure may comprise branched saccharides with α- and/or β-glycosidic bonds at various carbon positions, such as a 1,6-; 1,4-; 1,2-; 1,3-; and 4,6-glycosidic linkages. Surprisingly, the carbohydrate compositions prepared according to the disclosure have a glycosidic linkage profile similar to that of polydextrose, but with less than 10% sorbitol. In at least certain embodiments, the carbohydrate compositions may comprise less than 5% sorbitol, such as less than 1% sorbitol, substantially no sorbitol, or no sorbitol.

By way of non-limiting example only, the carbohydrate composition prepared according to the disclosure may comprise: 1,6-glycosidic linkages in an amount of greater than about 10%, such as greater than about 15%, for example about 10% to about 25% or about 15% to about 25%; 1,4-glycosidic linkages in an amount of less than about 30%, such as less than about 20%, such as less than about 10%; 1,2-glycosidic linkages in an amount up to about 10%, such as up to about 8%, for example from about 5% to about 7%; 1,3-glycosidic linkages in an amount up to about 10%, such as up to about 8%, for example from about 5% to about 8%, for example about 7%; and 4,6-glycosidic linkages in an amount up to about 5%, such as up to about 4%, such as, for example, about 2% to about 4%, or about 2.5% to about 3.5%.

In further exemplary embodiments, the carbohydrate compositions prepared according to the disclosure may comprise a ratio of 1,6-/1,4-glycosidic linkages of greater than about 0.4, such as greater than about 0.5, such as greater than about 0.6, for example from about 0.5 to about 4.0, such as about 1.0 to about 4.0, about 1.0 to about 3.0 or about 2.0 to about 2.5, for example about 2.1; a ratio of 1,6-/4,6-glycosidic linkages of greater than 1.0, such as greater than 2.0, greater than 3.0, greater than 4.0, greater than 4.5, greater than 4.6, such as about 4.5 to about 8; a ratio of 1,4-/1,2-glycosidic linkages of less than 8.0, such as less than 7.0, less than 6.0, less than 5.0, or less than 4.0, for example less than 3.9, less than about 3.8, or less than about 3.5, such as less than about 3.0, such as less than about 2.0, or about 1.0 to about 3.0, or about 1.0 to about 4.0; and a ratio of 1,4-/1,3-glycosidic linkages of less than about 6.0, such as less than about 5.0, less than about 4.0, less than about 3.0, such as less than about 2.9, such as less than about 2.8, such as less than about 2.5, such as less than about 2.0, such as about 1.0 to about 2.5, or about 1.0 to about 2.0, or about 1.0 to about 2.5, such as about 1.0 to about 2.0.

In yet further exemplary embodiments, the carbohydrate compositions prepared according to the disclosure may comprise a ratio of (1,6-+1,4-)/1,2-glycosidic linkages of less than 6.4, such as less than about 6.0, such as less than about 5.5, such as less than about 5.0, such as about 4.0 to about 5.0, or 3.7 to 6.3; and a ratio of (1,6-+1,4-)/1,3-glycosidic linkages of less than 4.7, such as less than about 4.5, such as less than about 4.0, such as 3.2 to about 4.6, for example about 3.5. As yet a further non-limiting example, the carbohydrate composition of this disclosure may comprise a total sum of 1,6- and 1,4-glycosidic linkages less than about 35%, such as less than about 30%, for example ranging from about 20% to about 30%, such as about 23% to about 27%, for example about 25%.

In various exemplary embodiments, the carbohydrates and carbohydrate compositions according to the disclosure may have reduced-calorie content. By "reduced calorie content", "reduced calorie", and variations thereof, which may be used interchangeably herein, it is intended that the carbohydrate composition has a lower calorie content, respectively, relative to either (1) the starting material (i.e., saccharide feedstock), or (2) traditional starch-derived carbohydrate compositions, or (3) other nutritive carbohydrates such as sucrose (or "table sugar"), maltose, lactose, glucose, galactose and fructose. At least in part, the reduced calorie content is believed to be due to the lower-digestibility of the carbohydrate compositions as well as the reduced sugar content, as described above.

While not wishing to be limited, as any reduction in calorie content is contemplated within the disclosure, the carbohydrate compositions disclosed herein may have a calorie content that is up to about 100% lower than either the starting material or traditional forms of the component or product. In various exemplary embodiments, the calorie content may be up to about 95% lower, such as up to about 90% lower, up to about 85% lower, up to about 80% lower, up to about 75% lower, up to about 70% lower, up to about 65% lower, up to about 60% lower, up to about 55% lower, up to about 50% lower, up to about 45% lower, up to about 40% lower, up to about 35% lower, up to about 30% lower, up to about 25% lower, up to about 20% lower, up to about 15% lower, up to about 10% lower, or up to about 5% lower, with the understanding that each of these numbers may represent an endpoint for either a low-end or high-end of any subrange between about 5% and about 95%. By way of non-limiting example only, carbohydrate compositions made according to various embodiments of the disclosure may have about a 25-75% reduced calorie content, such as, for example, about a 40-75% or about a 40-50% reduced calorie content, relative to current traditional corn syrups and current traditional nutritive sweeteners.

In at least certain exemplary embodiments according to the disclosure, the carbohydrate compositions may have caloric values of less than about 4 kcal/g, such as less than about 3.5 kcal/g, such as less than about 3 kcal/g, such as less than about 2.5 kcal/g, such as less than about 2 kcal/g, such as less than about 1.5 kcal/g, or less than about 1 kcal/g, calculated on a dry weight basis and when ingested by a human or other mammal. In at least certain preferred embodiments, the carbohydrate compositions may have caloric values ranging from about 1 to about 3 kcal/g.

As used herein, the terms "low-digestibility", "lower-digestibility", and variations thereof, which may be used interchangeably herein, are meant to indicate that the carbohydrate composition of the present disclosure has a lower degree of digestibility relative to either (1) the starting material (i.e., saccharide feedstock), or (2) traditional starch-derived carbohydrate compositions, or (3) other traditional nutritive sweeteners such as sucrose (or "table sugar"), maltose, lactose, glucose, galactose and fructose. In at least certain exemplary embodiments, the lower digestibility may be due, in part, to some amount of the carbohydrate being non-digestible or substantially non-digestible, as described above.

While not wishing to be limited, as any reduction in digestibility is contemplated within the disclosure, the carbohydrate compositions may have a digestibility that is up to about 100% lower than either the starting material or traditional forms of the component or product. In various exemplary embodiments, the digestibility may be up to about 95% lower, such as up to about 90% lower, up to about 85% lower, up to about 80% lower, up to about 75% lower, up to about 70% lower, up to about 65% lower, up to about 60% lower, up to about 55% lower, up to about 50% lower, up to about 45% lower, up to about 40% lower, up to about 35% lower, up to about 30% lower, up to about 25% lower, up to about 20% lower, up to about 15% lower, up to about 10% lower, or up to about 5% lower, with the understanding that each of these numbers may represent an endpoint for either a low-end or high-end of any subrange between about 5% and about 95%. By way of example, digestibility may be in the range of about 5-50%, such as about 5-35%, about 5-30%, about 10-30%, or about 20-30%.

Additionally, and as another way of considering the lower digestibility of the carbohydrate compositions, it is further understood that the carbohydrate compositions disclosed herein have a digestibility that is less than 100%, i.e. that is not completely digestible or that there is some percentage that is not digestible. By way of example, the carbohydrates, carbohydrate compositions, and products disclosed herein may have a digestibility of less than about 95% (i.e. about 5% is not digestible), such as less than about 90% (i.e. about 10% is not digestible), less than about 85% (i.e. about 15% is not digestible), less than about 80% (i.e. that about 20% is not digestible), less than about 75% (i.e. that about 25% is not digestible), less than about 70% (i.e. that about 30% is not digestible), less than about 65% (i.e., that about 35% is not digestible, less than about 60% (i.e. about 40% is not digestible), less than about 55% (i.e. about 45% is not digestible), less than about 50% (i.e. that about 50% is not digestible), less than about 45% (i.e. that about 55% is not digestible), less than about 40% (i.e. that about 60% is not digestible), less than about 35% (i.e., that about 65% is not digestible), less than about 30% (i.e. about 70% is not digestible), less than about 25% (i.e. about 75% is not digestible), less than about 20% (i.e. that about 80% is not digestible), less than about 15% (i.e. that about 85% is not digestible), less than about 10% (i.e. that about 90% is not digestible), or less than about 5% (i.e., that about 95% is not digestible). In certain preferred embodiments, the carbohydrate compositions have a digestibility ranging from about 5% to about 95%, such as about 5% to about 75%, about 5% to about 50%, or about 5% to about 35%.

Similarly, "reduced sugar content", "reduced sugar", and variations thereof, which may be used interchangeably herein, are meant to indicate that the carbohydrate composition has a lower sugar content relative to either (1) the starting material (i.e., the saccharide feedstock), or (2) traditional starch-derived carbohydrate compositions, or (3) other nutritive carbohydrates such as sucrose (or "table sugar"), maltose, lactose, glucose, galactose and fructose. While not wishing to be limited, as any reduction in sugar content is contemplated within the disclosure, the carbohydrate compositions disclosed herein may have a sugar content that is up to about 100% lower than either the starting material or traditional forms of the component or product. In various exemplary embodiments, the sugar content may be up to about 95% lower, such as up to about 90% lower, up to about 85% lower, up to about 80% lower, up to about 75% lower, up to about 70% lower, up to about 65% lower, up to about 60% lower, up to about 55% lower, up to about 50% lower, up to about 45% lower, up to about 40% lower, up to about 35% lower, up to about 30% lower, up to about 25% lower, up to about 20% lower, up to about 15% lower, up to about 10% lower, or up to about 5% lower, with the understanding that each of these numbers may represent an endpoint for either a low-end or high-end of any subrange between about 5% and about 95%. By way of non-limiting example only, carbohydrate compositions made according to various embodiments of the disclosure may have about a 20-75% reduced sugar content, such as, for example, about a 25-75% or about a 25-50% reduced sugar content, relative to traditional corn syrups having similar viscosities.

Carbohydrate compositions according to various embodiments of the disclosure may, in various embodiments, exhibit physical properties similar to that of traditional starch-derived carbohydrate compositions, such as, for example, concentration of dry solids, viscosity, color, and/or pH. However, in at least some exemplary embodiments, one or more of these physical properties may be different.

For example, in various embodiments, as mentioned above, the viscosities of the carbohydrate compositions of the present disclosure are surprisingly reduced compared to low DE corn syrups (e.g., 25 DE and 28 DE) as well as compared to commercially available reduced-sugar, reduced-calorie ingredients such as Litesse® polydextrose and Promitor™ soluble corn fiber. In at least certain exemplary embodiments according to the disclosure, the carbohydrate compositions have a viscosity less than 6,000 cPs, such as less than 5,800, less than 5,500 cPs, less than 5,000 cPs, less than 4,500 cPs, less than 4,000 cPs, less than 3,500 cPs, less than 3,000 cPs, less than 2,500 cPs, less than 2,000 cPs, less than 1,500 cPs, less than 1000 cPs, or less than 500 cPs, at about 75% DS and about 38° C. In at least certain preferred embodiments, the carbohydrate compositions have a viscosity ranging from about 2000 cPs to about 6000 cPs, such as about 2500 to about 4500 cPs, at 75% DS and 38° C.

As a yet further example, in various embodiments, the color of the inventive carbohydrate compositions may be comparable to that of traditional starch-derived carbohydrate compositions. A lighter-colored product may be desirable in certain applications. Color is determined by the following method:

Dilute the carbohydrate composition of the present disclosure using water to 50% DS. Color was determined using a spectrophotometer.

Briefly, syrup samples at 50% DS were dispensed into 1-cm spectrophotometer cell and the sample absorbance was read at 450 nm and 600 nm against water. Color was calculated using the following formula:

Color (CIRF*)=(absorbance at 450 nm−absorbance at 600 nm)×100

* Corn Industries Research Foundation

By way of example, the inventive carbohydrate composition may have CIRF values of less than about 10, less than about 8, less than about 5, less than about 4, less than about 3, less than about 2, or less than about 1, measured at 50% DS. In at least certain preferred embodiments, the carbohydrate compositions according to the disclosure have a CIRF value of less than 2, about 1 to about 8, such as about 1 to about 2, or greater than 1 to about 8, such as greater than 1 to less than 2 or ranging from 1 to 2. Conventional corn syrups have a CIRF of less than 1. In comparison, commercially available reduced-sugar reduced-calorie ingredients, such as Litesse® polydextrose, Promitor™ soluble corn fiber, resistant dextrin and resistant maltodextrin, have a CIRF value of greater than 6 measured at 50% DS.

According to one exemplary embodiment, the carbohydrate compositions produced according to various embodiments of the disclosure comprise saccharide molecules comprising greater than 90% glucose, less than about 30% DP1+2, on a dry weight basis, a weight average molecular weight ranging up to about 2000 daltons, such as from about 500 to about 2000 daltons, a PDI ranging up to about 2.0, greater than about 15% 1,6-glycosidic linkages, a ratio of 1,6-glycosidic/1,4-glycosidic linkages of greater than about 0.6, less than about 35% total 1,6-glycosidic and 1,4-glycidic linkages, and, a digestibility ranging from about 5 to about 50%. In further embodiments, the carbohydrate compositions produced according to various embodiments of the disclosure comprise saccharide molecules comprising greater than 90% glucose, less than about 25% DP1+2, on a dry weight basis, a weight average molecular weight ranging up to about 2000 daltons, such as from about 500 to about 2000 daltons, a PDI ranging from about 1.1 to about 1.8, from about 15% to about 19% 1,6-glycosidic linkages, a ratio of 1,6-glycosidic/1,4-glycosidic linkages ranging from about 0.7 to about 4.0, less than about 30% total 1,6-glycosidic and 1,4-glycidic linkages, and, a digestibility ranging from about 5 to about 35%. In various embodiments, the carbohydrate compositions may comprise 1,4-glycosidic linkages in an amount less than about 20%, and/or a ratio of 1,4-glycosidic/4,6-glycosidic linkages greater than about 4.0. In various embodiments, the carbohydrate compositions may have a CIRF value of less than about 8.0. In at least certain embodiments, the carbohydrate composition may have a caloric value of less than about 4 kcal/gram and/or a reduced calorie content in the range of about 25% to about 75%. According to further embodiments, the viscosity of the carbohydrate compositions is less than about 6000 cPs at about 75% DS and about 38° C.

In yet further exemplary embodiments, carbohydrate compositions prepared according to the disclosure comprise saccharide molecules comprising greater than 90% glucose, less than about 30% DP1+2, on a dry weight basis, a weight average molecular weight ranging up to about 2000 daltons, such as from about 500 to about 2000 daltons, a polydispersity index ranging up to about 2.0, greater than about 10% 1,6-glycosidic linkages, a ratio of 1,6-glycosidic/1,4-glycosidic linkages of greater than about 0.5, less than about 35% total 1,6-glycosidic and 1,4-glycidic linkages, and a digestibility ranging from about 5 to about 50%. Further exemplary embodiments of the carbohydrate compositions prepared according to the disclosure comprise saccharide molecules comprising greater than 90% glucose, less than about 30% DP1+2, on a dry weight basis, a weight average molecular weight ranging up to about 2000 daltons, such as from about 500 to about 2000 daltons, a polydispersity index ranging up to about 2.0, a total amount of DP3-5 greater than about 20%, a ratio of (DP3-5)/DP6+ greater than about 0.25, and a digestibility ranging from about 5 to about 50%. Yet further exemplary embodiments of the carbohydrate compositions prepared according to the disclosure comprise saccharide molecules comprising greater than 90% glucose, less than about 30% DP1+2, on a dry weight basis, a weight average molecular weight ranging up to about 2000 daltons, such as from about 500 to about 2000 daltons, a polydispersity index ranging up to about 2.0, a total amount of DP3-5 greater than about 20%, greater than about 10% 1,6-glycosidic linkage, a ratio of 1,6-glycosidic/1,4-glycosidic linkages of greater than about 0.5, and a digestibility ranging from about 5 to about 50%.

Additional embodiments of the disclosure related to processes for preparing the carbohydrate compositions. One exemplary embodiment comprises a treatment step comprising subjecting a feed composition comprised of a saccharide feedstock and at least one catalyst to elevated temperature, wherein said treatment step produces an intermediate composition comprising an amount of DP1+2, on a dry weight basis, ranging from about 10% to about 85%, an amount of DP3+, on a dry weight basis, ranging from about 40% to about 80%, a ratio of DP5/DP2s ranging from about 0.4 to about 1.0, an amount of DP16+, on a dry weight basis, of less than about 15%, a polydispersity index ranging from about 1.2 to about 3.5, a weight average molecular weight ranging from about 300-3200 daltons, and a viscosity ranging from about 300 cPs to about 8000 cPs, measured at 75% DS and 38° C. Further embodiments comprise a separation step comprising separating an intermediate composition, optionally prepared as described, into at least two streams, wherein at least one first stream comprises about 30% to about 100% DP1+2, and wherein at least one second stream comprises less than about 30% DP1+2.

Additional embodiments according to the disclosure relate to foodstuffs or products chosen from food or beverage products or nutritional supplements, said foodstuff or product comprising a carbohydrate composition comprising saccharide molecules comprising greater than 90% glucose, less than about 30% DP1+2, on a dry weight basis, a weight average molecular weight ranging from about 500 to about 2000 daltons, a polydispersity index ranging up to about 2.0, greater than about 10% 1,6-glycosidic linkages, a ratio of 1,6-glycosidic/1,4-glycosidic linkages of greater than about 0.5, less than about 35% total 1,6-glycosidic and 1,4-glycidic linkages, and a digestibility ranging from about 5 to about 50%. Further embodiments according to the disclosure relate to foodstuffs or products chosen from food or beverage products or nutritional supplements, said foodstuff or product comprising a carbohydrate composition comprising saccharide molecules comprising greater than 90% glucose, less than about 30% DP1+2, on a dry weight basis, a weight average molecular weight ranging up to about 2000 daltons, such as from about 500 to about 2000 daltons, a polydispersity index ranging up to about 2.0, a total amount of DP3-5 greater than about 20%, a ratio of (DP3-5)/DP6+ greater than about 0.25, and a digestibility ranging from about 5 to about 50%. Yet further embodiments according to the disclosure relate to foodstuffs or products chosen from food or beverage products or nutritional supplements, said foodstuff or product comprising a carbohydrate composition comprising saccharide molecules comprising greater than 90% glucose, less than about 30% DP1+2, on a dry weight basis, a weight average molecular weight ranging up to about 2000 daltons, such as from about 500 to about 2000 daltons, a polydispersity index ranging up to about 2.0, a total amount of DP3-5 greater than about 20%, greater than about 10% 1,6-glycosidic linkage, a ratio of 1,6-glycosidic/1,4-glycosidic linkages of greater than about 0.5, and a digestibility ranging from about 5 to about 50%.

In at least certain embodiments, one or more of the feedstock, the feed composition, the intermediate composition, and the final carbohydrate composition do not comprise sorbitol. In a further embodiment, the carbohydrate composition contains substantially no sorbitol. In yet a further embodiment, the carbohydrate composition is not a mixture of 90:10 glucose:sorbitol. In yet further embodiments, the carbohydrate composition comprises saccharide molecules comprising greater than 90% glucose, and comprising less than 10% sorbitol. For example, the carbohydrate composition may comprise less than 9.5%, less than 9.0%, less than 8.5%, less than 8.0%, less than 7.5%, less than 7.0%, less than 6.5%, less than 6.0%, less than 5.5%, less than 5.0%, less than 4.5%, less than 4.0%, less than 3.5%, less than 3.0%, less than 2.5%, less than 2.0%, less than 1.5%, less than 1.0%, or less than 0.5% sorbitol, according to various exemplary embodiments.

The carbohydrate compositions prepared according to various embodiments of the disclosure may optionally be refined, e.g. using filters, centrifuges, granular activated carbons or ion-exchange resins, and excess water can be removed by evaporation or other methods known to those skilled in the art. The carbohydrate compositions may thus be in any form, such as, for example, in syrup form, liquid form (e.g. aqueous), or dry form.

Food Products

Products according to various embodiments of the disclosure may have lower digestibility and/or reduced sugar, as a result of the incorporation of the carbohydrate compositions having reduced sugar and/or lower-digestibility, as described herein. The reduced-sugar, lower-digestible carbohydrate compositions offer properties that are of particular importance to food manufacturing practices and the properties of finished foodstuffs. These important properties include a bland, neutral taste; minimal or no sweetness; compatibility with other sweeteners; and imparting smooth mouthfeel to finished foods and beverages. The inventive carbohydrate compositions can thus be used in any product that typically incorporates traditional starch-derived carbohydrates.

For example, the carbohydrate compositions according to various embodiments of the disclosure may be particularly suitable in food, beverage, and nutritional supplement applications intended for consumption by both humans and animals. Non-limiting examples of uses for the carbohydrate compositions disclosed herein include as bulking, binding and coating ingredients for cereals, bars, confectioneries, beverages and savory products; carriers for coloring agents, flavors, fragrances and essences, and high potency sweeteners; spray drying adjuncts such as for coffee extracts and tea extracts; bulking, bodying and dispersing agents such as in synthetic creams or coffee whiteners; ingredients promoting a moisture retention in bread, pastry and meats; components of dry soup mixes, bakery mixes, frosting mixes, spice mixes and blends, coverage powders, condiments, gravy mixes, sauce mixes and frozen dairy foods, and in fat mimetics. In addition, they are useful in the formulation of tabletting compounds which can be used in food products or pharmaceutical products, anti-caking agents, whipped products, protective coatings, agglomeration aids, and low- or reduced-calorie foods and beverages.

As discussed above, foodstuffs comprising the carbohydrate compositions described herein have shown properties relative to existing reduced-sugar, reduced-calorie sweeteners, e.g. Litesse® polydextrose, Nutriose® resistant dextrin, Fibersol-2® resistant maltodextrin, and Promitor™ soluble corn fiber, that are just as good or are improved. Such properties include, but are not limited to, decreased hardness in bars, baked cookies, muffins, and the like; baked cookie spread; baked muffin height and mouthfeel; cookie dough stiffness; and sweetened coatings such as on cereals and the like.

It may, therefore, according to various embodiments, be desirable to replace some or all sweetener in various foodstuffs with some amount of a carbohydrate composition prepared according to the disclosure. For example, current sweeteners may be replaced by an amount up to 100%, such as up to 90%, up to 80%, up to 75%, up to 70%, up to 60%, up to 50%, up to 40%, up to 30%, up to 25%, up to 20%, up to 15%, up to 10%, or up to 5%, by carbohydrate compositions according to the disclosure.

Figure 7:
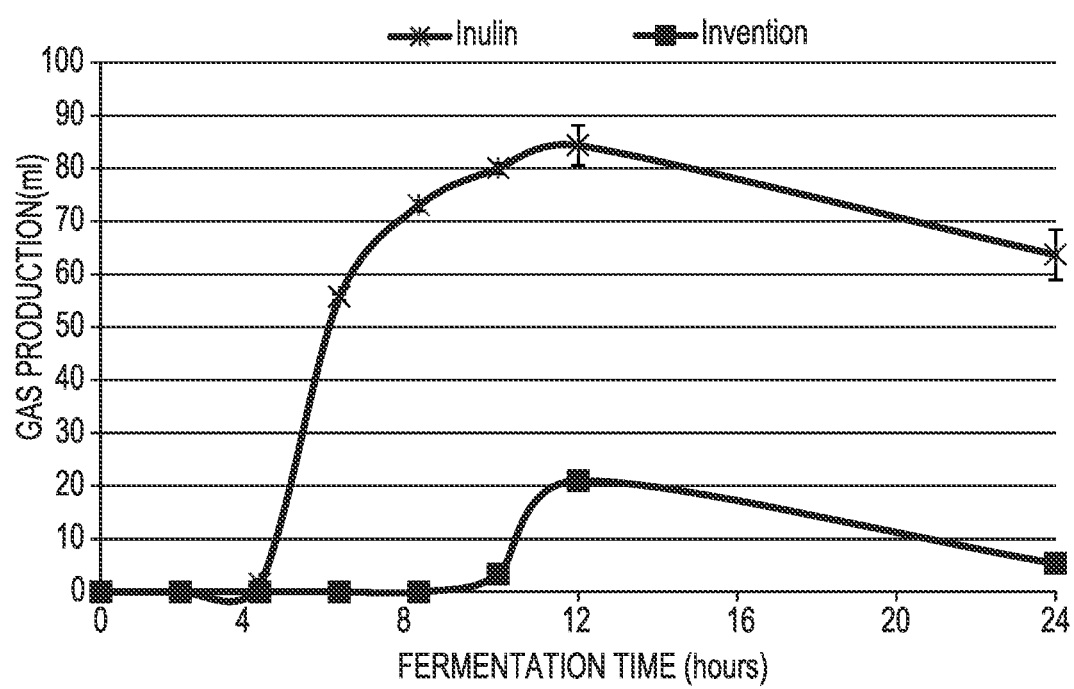
FIG. 7 is a graph of gas production comparing the carbohydrate composition and liquid inulin.

In yet a further embodiment, the carbohydrate compositions may be useful as a fiber source. As compared to other fiber sources, such as inulin, as FIG. 7 shows, the reduced-sugar low-digestibility carbohydrate compositions of this disclosure produced minimal amount of intestinal gas, and thus, the composition is more tolerable to the consumer. According to various embodiments, the amount of a food product that comprises the carbohydrate compositions according to the disclosure as a source of fiber may contain anywhere from about 60-100%, such as about 65-100%, about 70-100%, about 75-100%, about 80-100%, about 85-100%, about 90-100%, or about 95-100%, by weight of the carbohydrate composition.

Food products prepared according to various exemplary embodiments according to the disclosure have lower-calorie and/or reduced sugar content, relative to similar products prepared with traditional starch-derived carbohydrate compositions. By way of non-limiting example only, syrups (for example corn syrups prepared from corn starch derived feedstocks) prepared comprising carbohydrates and/or carbohydrate compositions according to the disclosure have lower calorie content and/or reduced sugar content than those prepared with traditional, starch-derived carbohydrates.

It is to be understood that while the inventive carbohydrate compositions described herein, made according to the processes described, and food products comprising the inventive carbohydrate compositions, may have one or more of soluble dietary fiber, reduced sugar, reduced calorie content, and/or lower digestibility, at least some inventive carbohydrate compositions, made according to the processes described, and food products comprising the inventive carbohydrate compositions may not have one or more of soluble dietary fiber, reduced sugar, reduced calorie content, and/or lower digestibility, yet are still contemplated to be within the scope of the disclosure.

It should be noted that, unless otherwise explicitly specified, all numbers recited herein are understood to be modified by the term "about." It should also be noted that the precise numerical values used in the specification (including examples) and claims form additional embodiments of the invention, and are intended to include any ranges which can be narrowed to any two end points disclosed within the exemplary ranges and values provided. Efforts have been made to ensure the accuracy of the numerical values disclosed herein. Any measured numerical value, however, can inherently contain certain errors resulting from the standard deviation found in its respective measuring technique.

It should further be noted that, unless otherwise explicitly specified, as used herein the terms "the," "a," or "an" mean "at least one," and should not be limited to "only one."

It should further be noted that, unless otherwise explicitly specified, the order in which steps are carried out is not critical, and thus, any method which carries out the specified steps in any order is contemplated to be within the scope of the disclosure.

The following Examples are provided to illustrate the carbohydrate composition and methods of making and preparing same. It is to be understood that both the foregoing description and the following Examples are exemplary and explanatory only, and are not to be interpreted as restrictive of the disclosure. Moreover, it should be understood that various features and/or characteristics of differing embodiments herein may be combined with one another. It is therefore to be understood that numerous modifications may be made to the illustrative embodiments and that other arrangements may be devised without departing from the true spirit and scope of the disclosure. Other embodiments will be apparent to those skilled in the art from consideration of the disclosure and practice of the various exemplary embodiments herein.

EXAMPLES

The following examples, including the materials and methods, are presented to illustrate the present disclosure and to assist one of ordinary skilled in making and using the same. The examples are not intended in any way to otherwise limit the scope of the disclosure.

The tables below provide an overview of the characteristics of the intermediate composition (Tables 1 and 2) and carbohydrate compositions (Tables 3-8, 12) according to the present disclosure, including data on the carbohydrate composition profile (DP-N), digestibility, viscosity, weight average molecular weight ($M_w$), number average molecular weight ($M_n$), polydispersity index (PDI), linkages, and dietary fiber concentrations. Food products comprising the carbohydrate compositions were also prepared and evaluated (Tables 9-11). For comparison purposes, traditional corn syrup products (25DE, 36DE, 43DE and 63DE corn syrup) as well as other reduced-sugar, reduced-calorie ingredients, Litesse® polydextrose (Danisco), Promitor-L85 (Tate & Lyle, Decatur, Ill.), Fibersol-2 (Matsutani Chemical Industry, Japan), and Nutriose® (Roquette) were also tested.

Example 1

Controlled Treatment Process to Produce Intermediate Composition

To produce an intermediate carbohydrate composition according to the present disclosure, the starting material of 95% dextrose at about 65% DS having 3% maltose, 0.5% maltotriose, and 1.5% DP3+ on a dry weight basis was used. Concentrated sulfuric acid ($H_2SO_4$) was added to the reaction mixture to achieve a concentration of 30-40 ppm $H_2SO_4$. The starting material and acid (i.e., the feed composition) were pumped into a 22-L horizontal mixer (Model M/DVT-22, LittlefordDay Inc., Florence, Ky.) equipped with the plow mixing assembly directly driven by a 3-phase, 230 V, 5HP motor and a PowerFlex 70 VFD control panel. After the feed composition was pumped to the mixer, the mixer was sealed and the plow was turned on at 200 rpm (60 Hz). About 20 inches of mercury vacuum was applied with a NASH vacuum pump (Model Delta EC50M, Gardner Denver Inc., Wayne, Pa.), and the content was heated for a period ranging from 20 to 60 minutes, to a temperature ranging from 120° C. to 180° C. by passing steam through the jacket of the mixer to remove moisture during the reaction. The power output from the mixing assembly and internal temperature were monitored. The power output provided an indirect measure of viscosity in the vessel under various treatment conditions, thus providing an indirect measure of DP16+ levels in the vessel. When a target power output ranging from 0.5 to 3.0 kilowatts (Kw) was reached, the steam and vacuum pump were turned off to terminate the process and the product was unloaded to a container.

Aliquots of small product samples were made with de-ionized water to about 75% DS for viscosity measurement, as follows. Brookfield viscometer (model LVDV-E 115, Brookfield Engineering Inc., Middlesboro, Mass.) with a 12-mL small sample adapter was used. Temperature of the small sample adapter was controlled at 38° C. using a circulation water bath. Spindle #S-25 was used while rotation speed was varied so that the percent torque fell between 25% and 75% during the viscosity measurements.

Enzymatic digestibilities of the product samples were analyzed using the Enzymatic Digestibility Assay, as follows. A 40 mg carbohydrate composition sample was completely dissolved in 3.98 ml of 0.05M citric acid buffer of pH 4.5 in a 10 mL test tube with cap and incubated with 20 μL of a glucoamylase and pullulanase enzyme mixture (Optimax 4060, Genencor International) at 60° C. for 2 hours. A blank containing 3.98 mL of the citric buffer and 20 microliters of the enzyme mixture was also incubated at 60° C. for 2 hours. The sample and the blank were then treated with about 0.5 grams of mixed resins (Dowex 66 and Dowex 88, Dow Chemical Co., Midland, Mich.) and filtered through a 0.45 micron filter. The carbohydrate composition of the filtered samples was analyzed by HPLC and the net weight percentage of glucose (weight percentage of sample glucose minus weight percentage of the blank glucose) was quantified as percent digestibility of the carbohydrate composition. The weight percentage of glucose was obtained by injecting 10 μL of the filtered samples to a high performance liquid chromatography (HPLC) system equipped with a refractive index detector and BioRad Aminex HPX-87C column (Bio-Rad, Hercules, Calif.) using water as eluent at a flow rate of 0.70 mL/min and at 85° C. for 12 minutes. The percent area of each peak relative to total areas of all peaks was used to quantitate each saccharide peak, with no refractive index response factor. The refractive index response for all saccharides is expected to be very similar. For comparison, the digestibility of products that are commercially available were also determined using this method.

The $M_w$, $M_n$, and PDI were determined by size-exclusion chromatography (SEC), a method in which molecules in solution are separated by their size, which correlates well to their molecular weight. Polysaccharides (i.e., DP16+) and larger oligosaccharides (e.g., DP11 to DP15) were also determined by this SEC method. Pullulan standards with known molecular weights of 5900, 9600, 21100, 47100, 107000, 200000, 344000 and 708000 were purchased from Showa Denko America (New York, N.Y.). Glucose, maltose, maltotriose, maltotetraose and maltohexose were purchased from Aldrich Chemicals (St. Louis, Mo.). 1% aqueous standard solutions were prepared by dissolving 0.10 gram of each standard in 10.0 mL of deionized water and then filtered through a 0.45 micron filter. Samples of the carbohydrate compositions were first de-ashed with 0.5 g Dowex66 and Dowex 88 mixed resins (Dow Chemical Co., Midland, Mich.) and then diluted with de-ionized water to about 1% followed by filtration through a 0.45 micron filter. 10 μL of either the standard solutions or sample solutions were injected into a HPLC system equipped with a Dionex P680 pump, a Shimadzu RID-6A detector, a 08033-TSKgel Guard PWx1 guard column and 3 TOSOH Bioscience SEC columns (TSK-GEL G4000pwx1, G3000pwx1 and G2500pwx1 connected in series). The chromatography was performed with deionized water as the eluent at a flow rate of 0.5 mL/min at 60° C. for 150 minutes. The resulting chromatograms were analyzed offline using Polylab SEC software.

The DP-N composition of a saccharide, specifically mono- and di-saccharides (i.e., DP1 and DP2) and smaller oligosaccharides (e.g., DP3 to DP10), was determined using HPLC. A sample was diluted with deionized water to 5% to 10% DS, de-ashed with 0.5 g ion exchange resins (Dowex 66 and Dowex 88, Dow Chemical Co., Midland, Mich.), and filtered through a 0.45 micron filter before injection into the HPLC for DP carbohydrate analysis. DP separation was accomplished using two BioRad Aminex HPX-42A, 300 mm×7.8 mm columns (BioRad, Hercules, Calif.) in series using water as the eluent at a flow rate of 0.20 mL/min at 65° C. for 150 minutes. Separated DP fractions were quantitated with a refractive index detector. The percent area of each peak relative to total areas of all peaks was used to quantitate each saccharide peak, with no refractive index response factor. The refractive index response for all saccharides is expected to be very similar.

DP1A and DP1B are understood to be one or more monosaccharides other than glucose, with non-limiting examples including fructose, psicose, lyxose, mannose, galactose, etc., or low-molecular weight degradation products from glucose. DP2C is understood to be one or more disaccharides, with non-limiting examples including isomaltose, gentiobiose, cellobiose, trehalose, etc. As used herein, DP2s is the sum of DP2 and DP2C.

TABLE 1

Molecular weight, digestibility, and viscosity of Example 1 compositions

| Example | digest-ibility % | cPs, 75% DS, 38° C. | Mn Dalt | Mw Dalt | PDI | 501 <= DP | 251-500 | 151-250 | 101-150 | 51-100 | 41-50 | 31-40 | 21-30 | 16-20 | 11-15 | DP <= 10 | DP 16+ | DP 11+ |
|---|---|---|---|---|---|---|---|---|---|---|---|---|---|---|---|---|---|---|
| | | | | | | | | | | | | | | | | % on dry weight basis | | |
| 1-A | 90 | 420 | 265 | 392 | 1.48 | | | | | | | | | | 0.02 | 0.33 | 99.6 | 0.02 | 0.35 |
| 1-B | 80 | 480 | 299 | 485 | 1.62 | | | | | | | | | 0.01 | 0.1 | 1.11 | 98.78 | 0.11 | 1.22 |
| 1-C | 70 | 581 | 337 | 558 | 1.66 | | | | | | | | | 0.02 | 0.17 | 1.67 | 98.15 | 0.19 | 1.86 |
| 1-D | 60 | 708 | 398 | 709 | 1.78 | | | | | | | | | 0.11 | 0.69 | 4.19 | 95 | 0.8 | 4.99 |
| 1-E | 50 | 1080 | 482 | 906 | 1.88 | | | | | | | | 0.03 | 0.57 | 2.06 | 8.1 | 89.24 | 2.66 | 10.76 |
| 1-F | 40 | 1530 | 616 | 1177 | 1.91 | | | | | | | 0.02 | 0.18 | 1.93 | 4.68 | 13.13 | 80.07 | 6.81 | 19.94 |
| 1-G | 30 | 2980 | 700 | 1464 | 2.09 | | | | | | 0.08 | 0.23 | 0.97 | 5.05 | 7.79 | 15.76 | 70.12 | 14.12 | 29.88 |
| 1-H | 25 | 3730 | 824 | 1741 | 2.11 | | | | | 0.01 | 0.28 | 0.55 | 1.9 | 7.67 | 9.89 | 17.59 | 62.12 | 20.3 | 37.89 |
| 1-I | 15 | 6700 | 926 | 3061 | 3.3 | 0.38 | 0.18 | 0.27 | 0.24 | 1.86 | 1.62 | 3.52 | 9.69 | 10.19 | 16.45 | 55.61 | 27.95 | 44.4 |
| 1-J | 10 | 7730 | 1104 | 2785 | 2.52 | 0.02 | 0.14 | 0.28 | 0.37 | 3.27 | 2.54 | 4.96 | 12.2 | 11.65 | 17.21 | 47.38 | 35.43 | 52.64 |

TABLE 2

Detailed Saccharide Composition (% on dry weight basis) of Example 1

| Example | DP15+ Min 37 | DP14 43.2 | DP13 44.8 | DP12 46.7 | DP11 48.8 | DP10 51.0 | DP9 53.8 | DP8 56.8 | DP7 60.5 | DP6 65.7 | DP5 72.4 | DP4 76.5 | DP3 80.6 | DP2C 89.4 | DP2 93.3 | DP1 103.6 | DP1B 115.2 | DP1A 134.4 |
|---|---|---|---|---|---|---|---|---|---|---|---|---|---|---|---|---|---|---|
| 1-A | | | | | | | 16.46 | | | | | | 10.9 | 14 | 55.7 | 2.76 | 0.64 |
| 1-B | | | | | | 10.39 | | | | | | 12.47 | 11.4 | 14 | 49.6 | 1.43 | 0.84 |
| 1-C | | | | | | 17.91 | | | | | | 13.85 | 11.6 | 13 | 39.2 | 3.07 | 1.26 |
| 1-D | | | | | 17.28 | | | | | | 10.44 | 16.59 | 12.2 | 12 | 29.1 | 1.86 | 1 |
| 1-E | | | | | 28.86 | | | | | | 11.74 | 17 | 10.6 | 8.8 | 20.3 | 1.49 | 1.22 |
| 1-F | | | | 31.72 | | | | | 9.04 | 11.73 | 15.02 | 8.75 | 7.4 | 12.9 | 1.86 | 1.53 |
| 1-G | | | | 41.02 | | | | | 6.2 | 7.28 | 9.2 | 12 | 6.96 | 5.6 | 10.2 | 0.88 | 1.07 |
| 1-H | | | | 56.63 | | | | | | 6.81 | 8.1 | 9.6 | 5.41 | 4.6 | 7.26 | 0.18 | 1.32 |
| 1-I | | | 58.75 | | | | | 5.21 | 6.04 | 6.43 | 4.3 | 3.7 | 7.75 | 2.5 | 3.85 | 1.54 | |
| 1-J | | | 75.48 | | | | | | 5.54 | 4.41 | 2.2 | 2 | 2.91 | 2.3 | 3.49 | 1.64 | |

| Example | DP1 + 2 note 1 | DP2s note 2 | DP3+ | DP3 + 4 | DP3 − 5 | Ratio of DP5 to DP1 + 2 | Ratio of DP5 to DP2s | Ratio of DP3 − 5 to DP1 + 2 | Ratio of DP3 − 5 to DP2s |
|---|---|---|---|---|---|---|---|---|---|
| 1-A | 83.54 | 24.5 | 16.5 | | | | | | |
| 1-B | 77.15 | 25.3 | 22.9 | 12.47 | | | | | |
| 1-C | 68.26 | 24.8 | 31.7 | 13.85 | | | | | |
| 1-D | 55.69 | 23.7 | 44.3 | 16.59 | 27.03 | 0.19 | 0.44 | 0.49 | 1.14 |
| 1-E | 42.39 | 19.4 | 57.6 | 17 | 28.74 | 0.28 | 0.61 | 0.68 | 1.48 |
| 1-F | 32.48 | 16.2 | 67.5 | 15.02 | 26.75 | 0.36 | 0.73 | 0.82 | 1.66 |
| 1-G | 24.67 | 12.5 | 75.3 | 20.84 | 28.12 | 0.30 | 0.58 | 1.14 | 2.24 |
| 1-H | 18.78 | 10 | 81.2 | 17.78 | 24.59 | 0.36 | 0.68 | 1.31 | 2.45 |
| 1-I | 15.62 | 10.2 | 84.4 | 7.94 | 14.37 | 0.41 | 0.63 | 0.92 | 1.40 |
| 1-J | 10.35 | 5.22 | 89.7 | 4.23 | 8.64 | 0.43 | 0.84 | 0.83 | 1.66 | note 1: the sum of DP1, DP1A, DP1B, DP2, and DP2C
note 2: the sum of DP2 and DP2C Results in Table 1 and Table 2 show the intermediate samples with increasing conversion of dextrose from sample 1-A through sample 1-J. Samples 1-A, 1-B, and 1-C are exemplary embodiments with less than about 1% polysaccharides and greater than 55% DP1+2, and because of the high concentration of DP1+2, they could be heavily recycled in the first stream of the second process step. Samples 1-D, 1-E, and 1-F are exemplary embodiments with less than about 10% polysaccharides and less than about 55% DP1+DP2, which could be less heavily recycled in the first stream of the second process step. Samples 1-H, 1-I, and 1-J are examples similar to existing reduced-sugar, reduced calorie products with greater than about 15% polysaccharides and less than about 20% DP1+DP2, but with a PDI of greater than 2.

Example 2

Preparation of Carbohydrate Compositions

Figure 3:
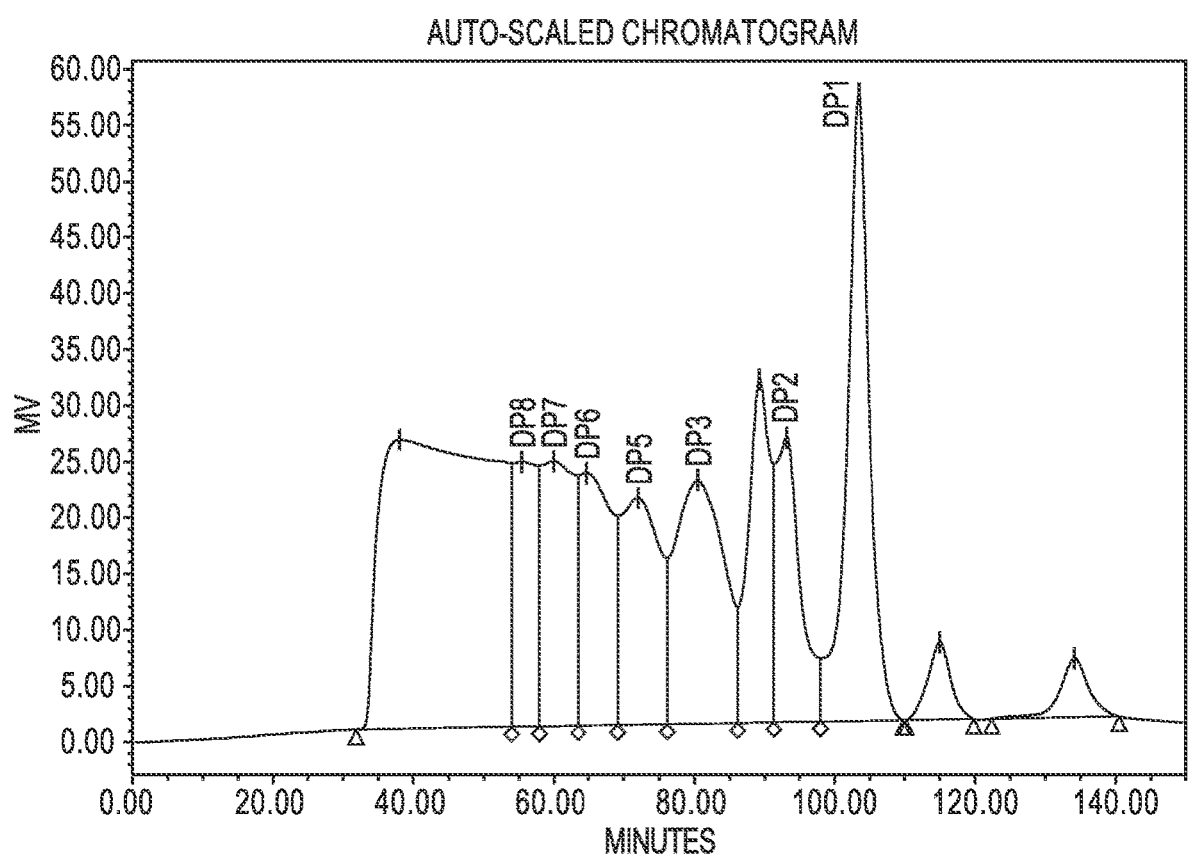
FIG. 3 is a chromatogram of 2B feed from Example 2.
Figure 4:
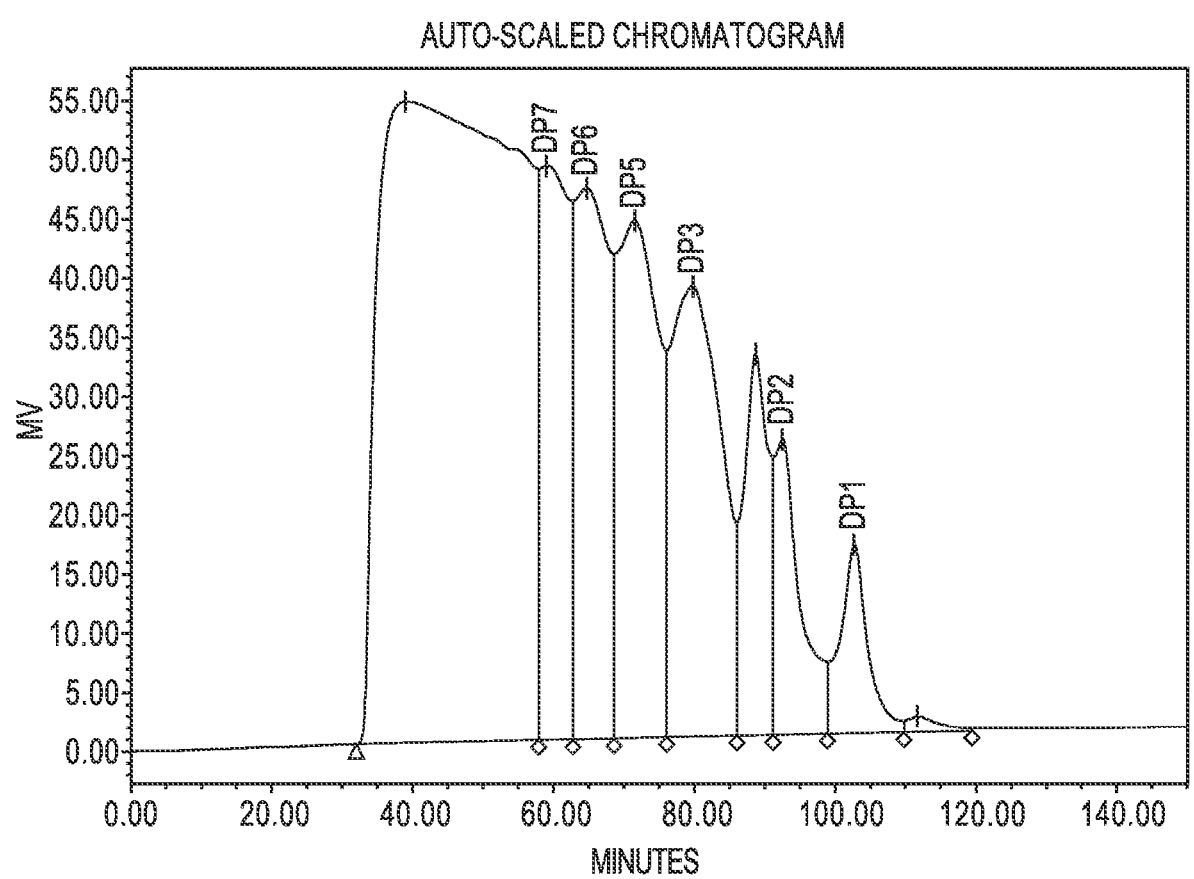
FIG. 4 is a chromatogram of 2B product from Example 2, Table 4.
Figure 5:
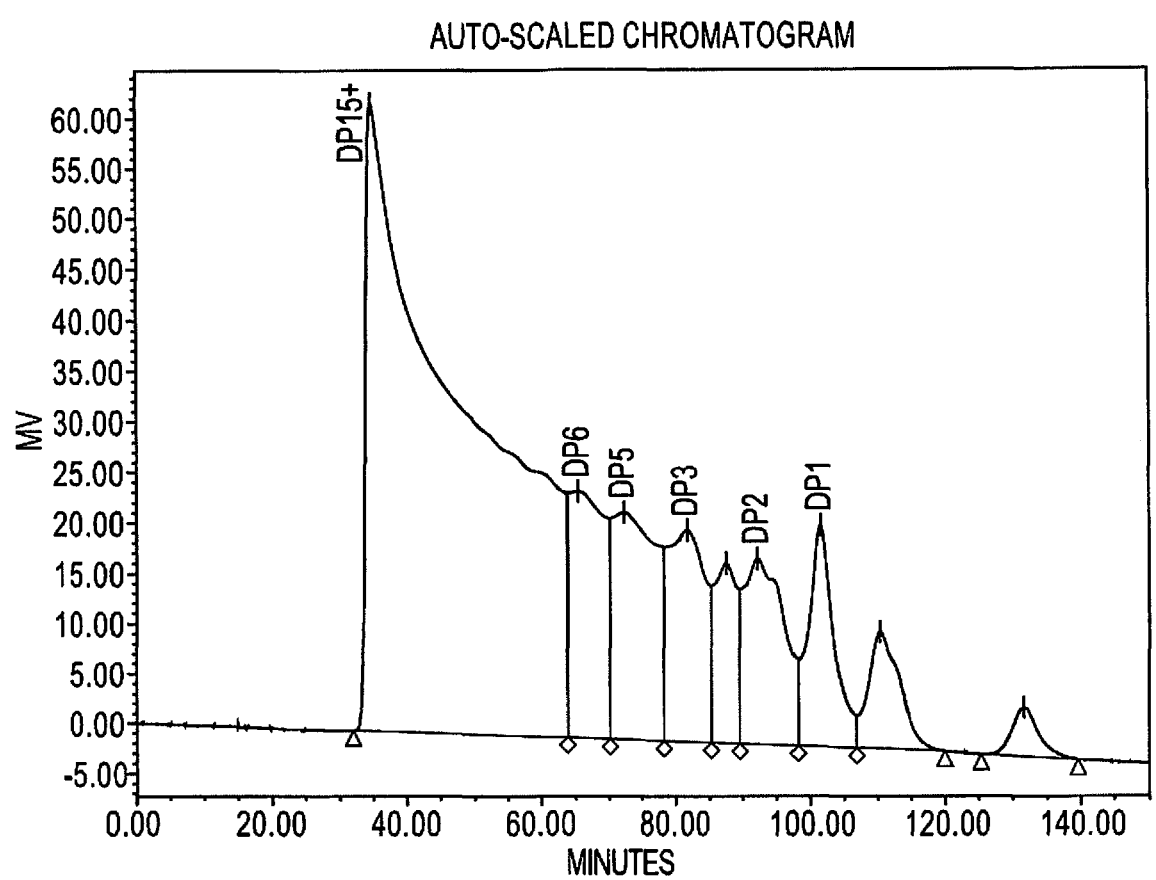
FIG. 5 is a chromatogram of polydextrose from Table 4.
Figure 6:
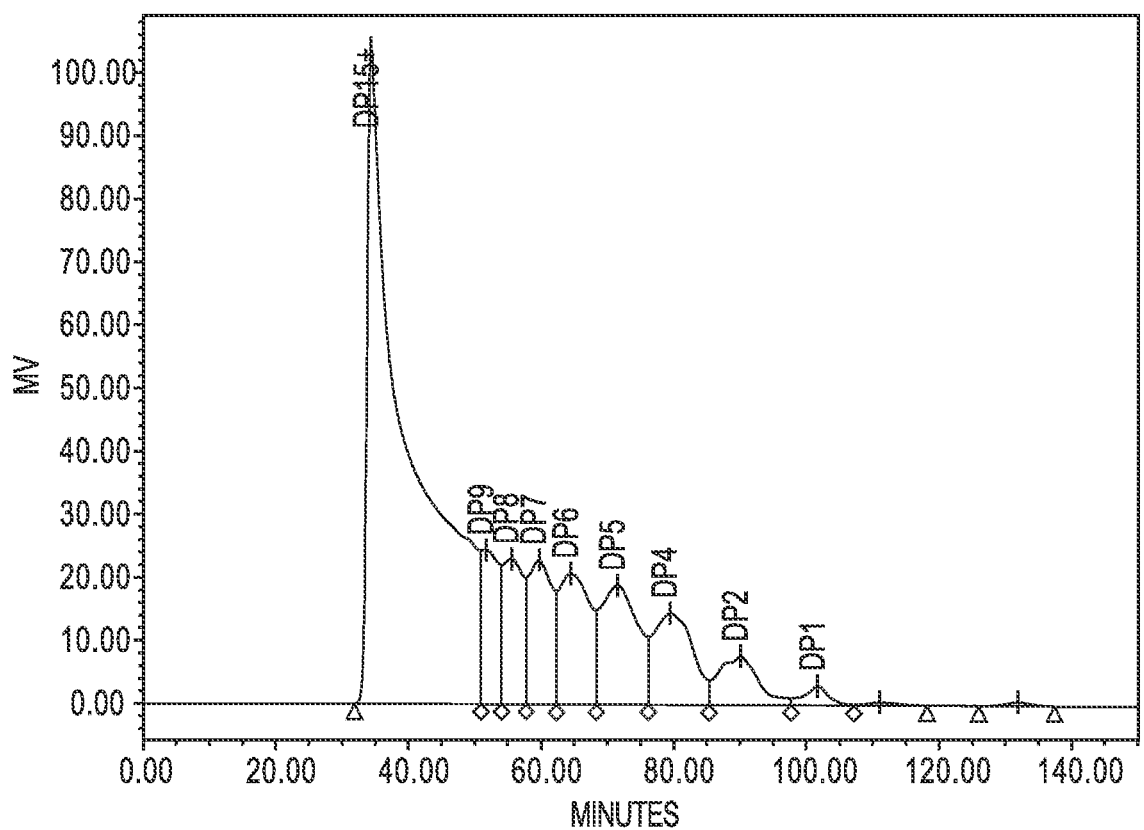
FIG. 6 is a chromatogram of Promitor-L85 from Table 4.

Intermediate carbohydrate compositions were produced as described in Example 1. These intermediate compositions, designated as 2A and 2B feeds, had about 65% DP3+(2A feed) or about 70% DP3+(2B feed), as shown in FIGS. 1 and 3. The 2A and 2B feeds were each dissolved and diluted with de-ionized water to form a solution of about 60% DS. Each solution (1 L per pulse) was pulsed through a column (6" diameter by 48" long) packed with 22L of UBK530 resin (Mitsubishi Chemicals) in hydrogen (H+) form at about 60° C. and de-gassed water was used as the eluent at a flow rate of about 1.1 L/minute to produce a stream enriched in DP1+2 (time: 8.5-9.5 minutes) and another stream enrich in DP3+ oligosaccharides and polysaccharides (time: 9.5-19 minutes). The DP3+ enriched streams were sequentially passed through a column packed with granular active carbon (Calgon Carbon Corporation) at about 70° C. and a flow rate of about ½ bed volume/hour, another column packed with Dowex 66 anionic resin (Dow Chemical), and then another column packed with mixed resins of Dowex 22 and Dowex 88 (Dow Chemical) at about 50° C. and a flow rate of about 3 bed volumes/hour. The carbon and ion-exchange resin treated solution was evaporated at about 70° C. to a final syrup of about 81% DS. The final products (i.e., carbohydrate compositions according to the present disclosure) were designated as 2A and 2B products. Aliquots of 2A and 2B product were analyzed for digestibility, viscosity, molecular weight and oligosaccharides, as described in Example 1. For comparison, conventional corn syrups as well as commercially available reduced-sugar, reduced-calorie products were also analyzed.

As can be seen in Table 3 below, 2A and 2B products have lower digestibility as compared to traditional corn syrup at similar viscosity. As can also be seen, 2A and 2B products have lower viscosity than the commercially available reduced-sugar, reduced-calorie products, as well as lower molecular weight and smaller PDI values than the commercially available reduced-sugar, reduced-calorie products.

TABLE 3

Digestibility, viscosity and molecular weight characteristics of Example 2 as compared to conventional corn syrups and commercially available reduced-sugar reduced-digestibility products

| Example | Color CIRF | digestibility % | cPs, 75% DS 38° C. | Mn Dalt | Mw Dalt | PDI | 501 <= DP % on dry weight basis | 251-500 | 151-250 |
|---|---|---|---|---|---|---|---|---|---|
| 2A product | 1.3 | 28 | 3120 | 801 | 1243 | 1.55 | | | |
| 2B product | 1.9 | 27 | 5570 | 862 | 1522 | 1.77 | | | |
| Polydextrose | 20.0 | 15 | 4670 | 845 | 1693 | 2.00 | | | |
| Promitor-L85 | 7.1 | 10 | 13800 | 1250 | 2208 | 1.77 | | | 0.06 |
| 25(28) DE | | >95 | 10100 | 856 | 2543 | 2.97 | | 0.01 | 0.21 |
| 36DE | | >95 | 3410 | 641 | 1650 | 2.57 | | | 0.01 |
| 43DE | | >95 | 2330 | 476 | 1190 | 2.50 | | | 0.01 |
| 63DE | | >95 | 790 | 302 | 673 | 2.23 | | | |

| Example | 101-150 | 51-100 | 41-50 | 31-40 | 21-30 | 16-20 | 11-15 | DP <= 10 | DP16+ | DP11+ |
|---|---|---|---|---|---|---|---|---|---|---|
| | | | | % on dry weight basis | | | | | | |
| 2A product | | | | | 0.08 | 1.4 | 4.41 | 14.85 | 79.25 | 5.89 | 20.74 |
| 2B product | | 0.01 | 0.06 | 0.48 | 3.99 | 8.04 | 19.31 | 68.11 | 12.58 | 31.89 |
| Polydextrose | | 0.28 | 0.59 | 1.54 | 6.69 | 9.52 | 18.21 | 63.18 | 18.62 | 36.83 |
| Promitor-L85 | 0.18 | 1.31 | 1.24 | 2.95 | 10.26 | 12.01 | 20.09 | 51.91 | 28.01 | 48.1 |
| 25(28) DE | 0.9 | 5.14 | 2.36 | 3.73 | 7.06 | 5.92 | 9.56 | 65.1 | 25.33 | 34.89 |
| 36DE | 0.1 | 1.52 | 1.13 | 2.26 | 5.61 | 5.8 | 10.54 | 73.05 | 16.43 | 26.97 |
| 43DE | 0.08 | 0.87 | 0.61 | 1.22 | 3.08 | 3.25 | 6.38 | 84.52 | 9.12 | 15.5 |
| 63DE | 0.04 | 0.16 | 0.14 | 0.37 | 1.25 | 1.64 | 3.65 | 92.76 | 3.6 | 7.25 |

Data in Table 4 below and FIGS. 2 and 4-6 further demonstrate that the 2A and 2B products have a very different oligosaccharide composition than the commercially available reduced-sugar, reduced-calorie products. The carbohydrate compositions prepared according to the present disclosure have enriched levels of oligosaccharides of DP3-DP11, particularly enriched in DP3-DP5 and/or DP3-DP6. The 2A product has at least 1.5 to 2.1 more DP3-DP5, and/or 2.0 to 2.6 times more DP3-DP6, than the commercially-available reduced-sugar reduced-calorie products. In addition, the 2A product has at least 3.2 to 4.8 less polysaccharides, and/or 1.8 to 2.3 less higher oligosaccharides and polysaccharides, than the commercially-available reduced-sugar reduced-calorie products.

TABLE 4

Detailed saccharide composition (% on a dry weight basis) of Example 2 as compared to commercial products

| Example | DP15+ Min 37 | DP14 43.2 | DP13 44.8 | DP12 46.7 | DP11 48.8 | DP10 51.0 | DP9 53.8 | DP8 56.8 | DP7 60.5 | DP6 65.7 | DP5 72.4 | DP4 76.5 | DP3 80.6 | DP2 C 89.4 | DP2 93.3 | DP1 103.6 | DP1B 115.2 | DP1 A 134.4 |
|---|---|---|---|---|---|---|---|---|---|---|---|---|---|---|---|---|---|---|
| 2A product | | | | | | 40.3 | | | | | 11.17 | 14 | 16.1 | 7.65 | 5.8 | 4.74 | 0.27 | |
| 2B product | | | | 46.28 | | | | | 8.8 | 9.76 | 11.30 | 11.82 | | 4.98 | 4.06 | 2.77 | 0.27 | |
| Poly dextrose | | | | 55.92 | | | | | | 7.82 | 9.05 | | 7.03 | 3.72 | 6.8 | 5.15 | 3.33 | 1.14 |
| Promitor-L85 | | 53.19 | | | | 5.2 | 5.9 | 6.8 | 8 | 8.76 | 7.06 | | | 3.8 | 0.93 | 0.18 | 0.19 | |

| Example | DP1+2 note 1 | DP2s note 2 | DP3+ | DP3-4 | DP3-5 | DP3-6 | DP6+ | ratio of DP3-4 to DP6+ | ratio of DP3-5 to DP6+ | ratio of DP3-6 to DP6+ |
|---|---|---|---|---|---|---|---|---|---|---|
| 2A product | 18.44 | 13.43 | 81.6 | 30.1 | 41.27 | 41.27 | 40.29 | 0.75 | 1.02 | 1.02 |
| 2B product | 12.08 | 9.04 | 87.9 | 11.82 | 23.12 | 32.88 | 64.8 | 0.18 | 0.36 | 0.51 |
| Polydextrose | 19.03 | 10.55 | 81 | 7.03 | 16.08 | 23.9 | 64.89 | 0.11 | 0.25 | 0.37 |
| Promitor-L85 | 4.91 | 3.8 | 95.1 | 7.06 | 15.82 | 23.82 | 79.27 | 0.09 | 0.20 | 0.30 | note 1:
the sum of DP1, DP1A, DP1B, DP2, and DP2C
note 2:
the sum of DP2 and DP2C

Example 3

Preparation of Carbohydrate Compositions

Intermediate carbohydrate compositions were produced, as described in Example 1, having about 45% to about 65% DP3+. These intermediate compositions are designated as 10A-10G feeds. The feed materials were diluted with de-ionized water to form solutions of about 40% to about 60% DS. The feed solutions were continuously fed to a SMB (simulated moving bed) chromatographic system (a CSEP unit from Calgon Carbon Corporation) consisting of 10 chromatographic columns (each column was 2 inches diameter and 2 inches long) using de-gassed water as the eluent under the following conditions: temperature 50° C.-60° C.; step time 9-18 minutes; feed rate 2-24 mL/min; elution rate 30-80 ml/min; raffinate rate 5-40 mL/min; extract rate 5-40 mL/min. Two streams, the extract streams enriched in DP1+2 and the raffinate stream enriched in DP3+ oligosaccharides and polysaccharides, were thus produced. The DP3+ enriched streams were sequentially passed through a column packed with granular active carbon (Calgon Carbon Corporation) at about 70° C. and a flow rate of about ½ bed volume/hour, another column packed with Dowex 66 anionic resin (Dow Chemical), and then another column packed with mixed resins of Dowex 22 and Dowex 88 (Dow Chemical) at about 50° C. and a flow rate of about 3 bed volumes/hour. The carbon and ion-exchange resin treated solution was evaporated at about 70° C. to a final syrup of about 75% to about 85% DS. These final products (i.e., carbohydrate composition according to the present disclosure) were designated as 10A-10G products.

TABLE 5

Detailed Saccharide Composition of Example 3

| Example | DP15+ Min 37 | DP14 43.2 | DP13 44.8 | DP12 46.7 | DP11 48.8 | DP10 51.0 | DP9 53.8 | DP8 56.8 | DP7 60.5 | DP6 65.7 | DP5 72.4 | DP4 76.5 | DP3 80.6 | DP2 C 89.4 | DP2 93.3 | DP1 103.6 | DP1 B 115.2 | DP1A 134.4 |
|---|---|---|---|---|---|---|---|---|---|---|---|---|---|---|---|---|---|---|
| 10A | | | | | | 37.28 | | | | | 11.93 | 16.38 | 19.99 | 6.49 | 4.56 | 3.07 | 0.29 | |
| 10B | | | | 44.82 | | | | | 6.44 | 8.88 | 10.65 | 12.36 | 10.68 | 2.68 | 2.18 | 1.16 | 0.13 | |
| 10C | | | | | 36.4 | | | | | | | 22.2 | 25.9 | 8.44 | 5.38 | 1.52 | 0.19 | |

TABLE 5-continued

Detailed Saccharide Composition of Example 3

| | | | | | | | | |
|---|---|---|---|---|---|---|---|---|
| 10D | 60 | | 16.9 | 15.29 | 3.81 | 3.02 | 0.84 | 0.13 |
| 10E | 27.92 | 11.92 | 15.64 | 19.75 | 8.48 | 7.32 | 8.23 | 0.67 | 0.07 |
| 10F | 30.4 | 9.08 | 12.56 | 20.34 | 11.16 | 9.59 | 6.35 | 0.54 | |
| 10G | 28.57 | 12.74 | 15.85 | 21.99 | 9.23 | 8.00 | 3.16 | 0.47 | |

| Example | DP1+2 | DP2s | DP3+ | DP3+4 | DP3-5 | DP3-6 | DP6+ | ratio of DP3-4 to DP1+2 | ratio of DP3-4 to DP6+ | ratio of DP3-5 to DP1+2 | ratio of DP3-5 to DP6+ | ratio of DP3-6 to DP1+2 | ratio of DP3-6 to DP6+ | ratio of DP5 to DP1+2 | ratio of DP5 to DP6+ |
|---|---|---|---|---|---|---|---|---|---|---|---|---|---|---|---|
| 10A | 14.41 | 11.05 | 85.59 | 19.99 | 36.37 | 48.3 | 49.22 | 1.39 | 0.41 | 2.52 | 0.74 | 3.35 | 0.98 | 1.14 | 0.33 |
| 10B | 6.15 | 4.86 | 93.85 | 10.68 | 23.04 | 33.69 | 70.81 | 1.74 | 0.15 | 3.75 | 0.33 | 5.48 | 0.48 | 2.01 | 0.17 |
| 10C | 15.53 | 13.82 | 84.47 | 25.9 | 48.1 | 48.1 | 36.37 | 1.67 | 0.71 | 3.10 | 1.32 | 3.10 | 1.32 | 1.43 | 0.61 |
| 10D | 7.8 | 6.83 | 92.2 | 15.29 | 32.19 | 32.19 | 60.01 | 1.96 | 0.25 | 4.13 | 0.54 | 4.13 | 0.54 | 2.17 | 0.28 |
| 10E | 24.77 | 15.8 | 75.23 | 19.75 | 35.39 | 47.31 | 39.84 | 0.80 | 0.50 | 1.43 | 0.89 | 1.91 | 1.19 | 0.63 | 0.39 |
| 10F | 27.64 | 20.75 | 72.36 | 20.34 | 32.9 | 41.98 | 39.46 | 0.74 | 0.52 | 1.19 | 0.83 | 1.52 | 1.06 | 0.45 | 0.32 |
| 10G | 20.86 | 17.23 | 79.14 | 21.99 | 37.84 | 50.58 | 41.30 | 1.05 | 0.53 | 1.81 | 0.92 | 2.42 | 1.22 | 0.76 | 0.38 |

TABLE 6

Digestibility, Viscosity and Molecular Weight Characteristics of Example 3

| Example | Color CIRF | digestibility % | cPs, 75% DS 38° C. | Mn Dalt | Mw | PDI | 501 <= DP % on dry weight basis by SEC | 251-500 |
|---|---|---|---|---|---|---|---|---|
| 10A | 7.3 | 20% | 4020 | 800 | 1168 | 1.5 | | |
| 10B | 6.8 | 13% | 5430 | 1138 | 1658 | 1.5 | | |
| 10C | 5.6 | 23% | 3060 | 722 | 930 | 1.3 | | |
| 10D | 4.5 | 21% | 5790 | 941 | 1269 | 1.4 | | |
| 10E | 2.0 | 29% | 2340 | 617 | 959 | 1.6 | | |
| 10F | 2.0 | 28% | 3150 | 691 | 1104 | 1.6 | | |
| 10G | 2.1 | 25% | 3240 | 732 | 1039 | 1.4 | | |

| Example | 151-250 | 101-150 | 51-100 | 41-50 | 31-40 | 21-30 | 16-20 | 11-15 | DP <= 10 | DP16+ | DP11+ |
|---|---|---|---|---|---|---|---|---|---|---|---|
| | | | | | % on dry weight basis by SEC | | | | | | |
| 10A | | | | 0 | 0.1 | 1.1 | 3.3 | 12.4 | 83.1 | 4.50 | 16.90 |
| 10B | | | 0 | 0.1 | 0.7 | 5.2 | 9.5 | 21.1 | 63.3 | 15.50 | 36.60 |
| 10C | | | | | 0 | 0.5 | 5.3 | 94.2 | 0.50 | 5.80 | |
| 10D | | | | 0.05 | 1.12 | 4.08 | 15.2 | 79.56 | 5.25 | 20.45 | |
| 10E | | | | | 0 | 0.2 | 1.36 | 8.16 | 90.28 | 1.56 | 9.72 |
| 10F | | | | 0.05 | 0.96 | 3.31 | 11.97 | 83.72 | 4.32 | 16.29 | |
| 10G | | | | | 0 | 0.33 | 1.82 | 9.65 | 88.2 | 2.15 | 11.80 |

Example 4

Preparation of Carbohydrate Composition

An intermediate carbohydrate composition having about 65% DP3+ was produced as described in Example 1. After diluted with de-ionized water to a form solution of about 60% DS, the feed solution continuously fed to a SMB (simulated moving bed) chromatographic system to produce an extract stream enriched in DP1+DP2, and a raffinate stream enriched in DP3+ oligosaccharides and polysaccharides as described in Example 3. The DP3+ rich stream was sequentially passed through a column packed with granular active carbon (Calgon Carbon Corporation) at about 70° C. and a flow rate of about ½ bed volume/hour, another column packed with Dowex 66 anionic resin (Dow Chemical), and then another column packed with mixed resins of Dowex 22 and Dowex 88 (Dow Chemical) at about 50° C. and a flow rate of about 3 bed volumes/hour. To this refined stream, Cleardex 95® was added at about 8% level based on the dry weight of the mixture in order to produce a product comprising about 92% of a carbohydrate composition according to the disclosure, and about 8% of 95% dextrose corn syrup. The mixture was evaporated at about 70° C. to a final syrup of about 80% DS. This final product (i.e., a blend containing the carbohydrate composition of the present disclosure) was designated as 10H1 product.

As can be seen in Table 7 below, this product had a lower digestibility, a lighter color, a lower viscosity, lower molecular weight and smaller PDI values than the commercially available reduced-sugar, reduced-calorie products shown in Table 3.

TABLE 7

Digestibility, Viscosity, Molecular Weight, and Saccharide Composition of Example 4

| Example | Color CIRF | digest % | cPs, 75% DS 38° C. | Mn Dalt | Mw | PDI | 501<= DP | 251-500 | 151-250 | 101-150 | 51-100 |
|---|---|---|---|---|---|---|---|---|---|---|---|
| | | | | | | | % on dry weight basis by SEC | | | | |
| 10H-1 | 0.9 | 24 | 4230 | 795 | 1312 | 1.7 | | | | | |
| DPs (%) | | | DP15+ | DP14 | DP13 | DP12 | DP11 | DP10 | DP9 | DP8 | DP7 |
| | | | Min 37 | 43.2 | 44.8 | 46.7 | 48.8 | 51.0 | 53.8 | 56.8 | 60.5 |
| 10H-1 | | | | | | | 29.73 | | | 9.3 | 10.99 |

| Example | Color CIRF | digest % | cPs, 75% DS 38° C. | 41-50 | 31-40 | 21-30 | 16-20 | 11-15 | DP <= 10 | DP 16+ | DP 11+ |
|---|---|---|---|---|---|---|---|---|---|---|---|
| | | | | % on dry weight basis by SEC | | | | | | | |
| 10H-1 | 0.9 | 24 | 4230 | | | 1.3 | 4.9 | 17.6 | 76.1 | 6.20 | 23.80 |
| DPs (%) | | | DP15+ | DP6 | DP5 | DP4 | DP3 | DP2C | DP2 | DP1 | DP1B |
| | | | Min 37 | 65.7 | 72.4 | 76.5 | 80.6 | 89.4 | 93.3 | 103.6 | 115.2 |
| 10H-1 | | | | 12.72 | 13.11 | 10.38 | | 2.46 | 2.08 | 9.01 | 0.22 |

Figure 12:
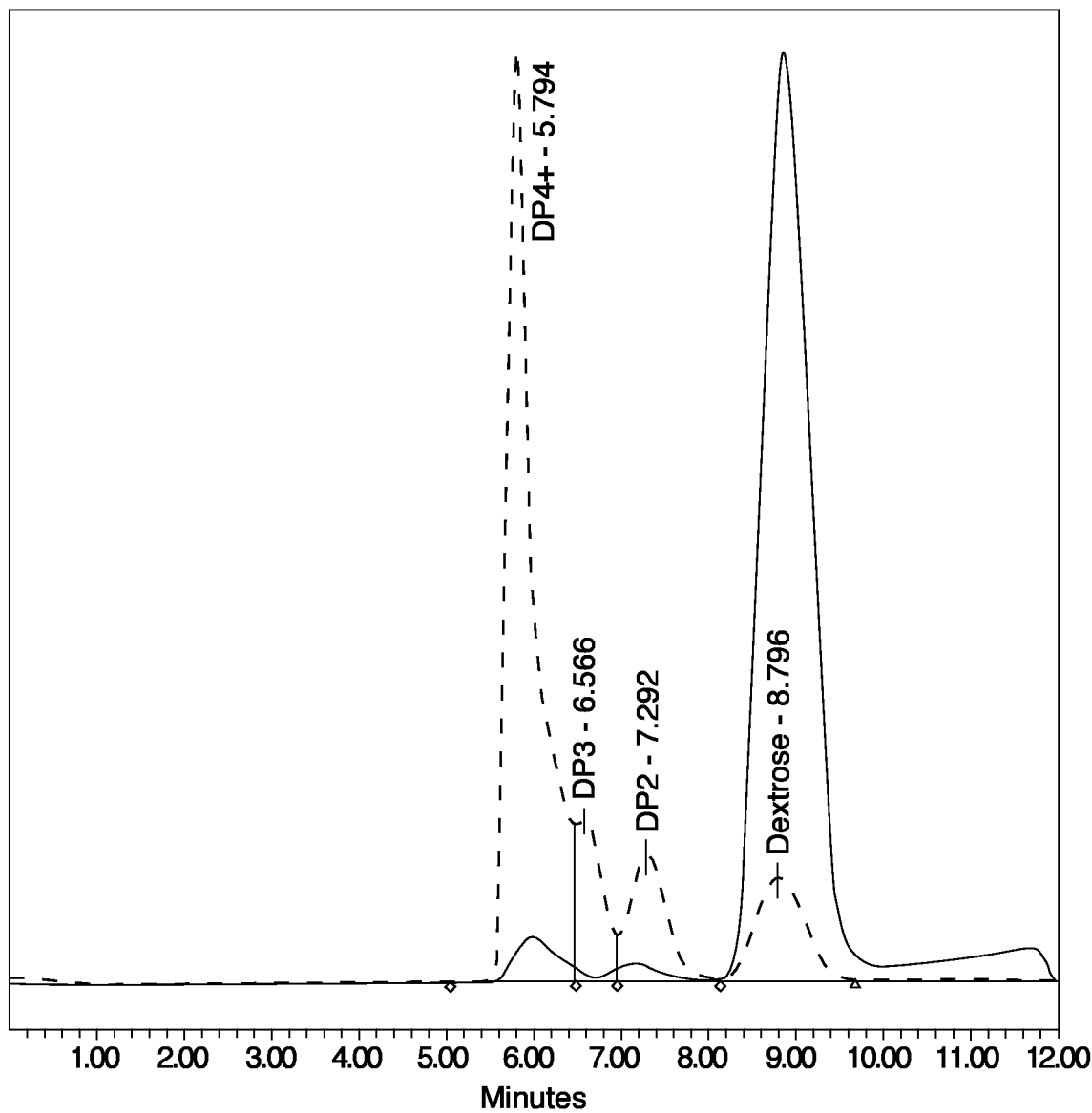
FIG. 12 is a chromatogram of a 36 DE corn syrup, pre- and post-enzymatic digestion.
Figure 13:
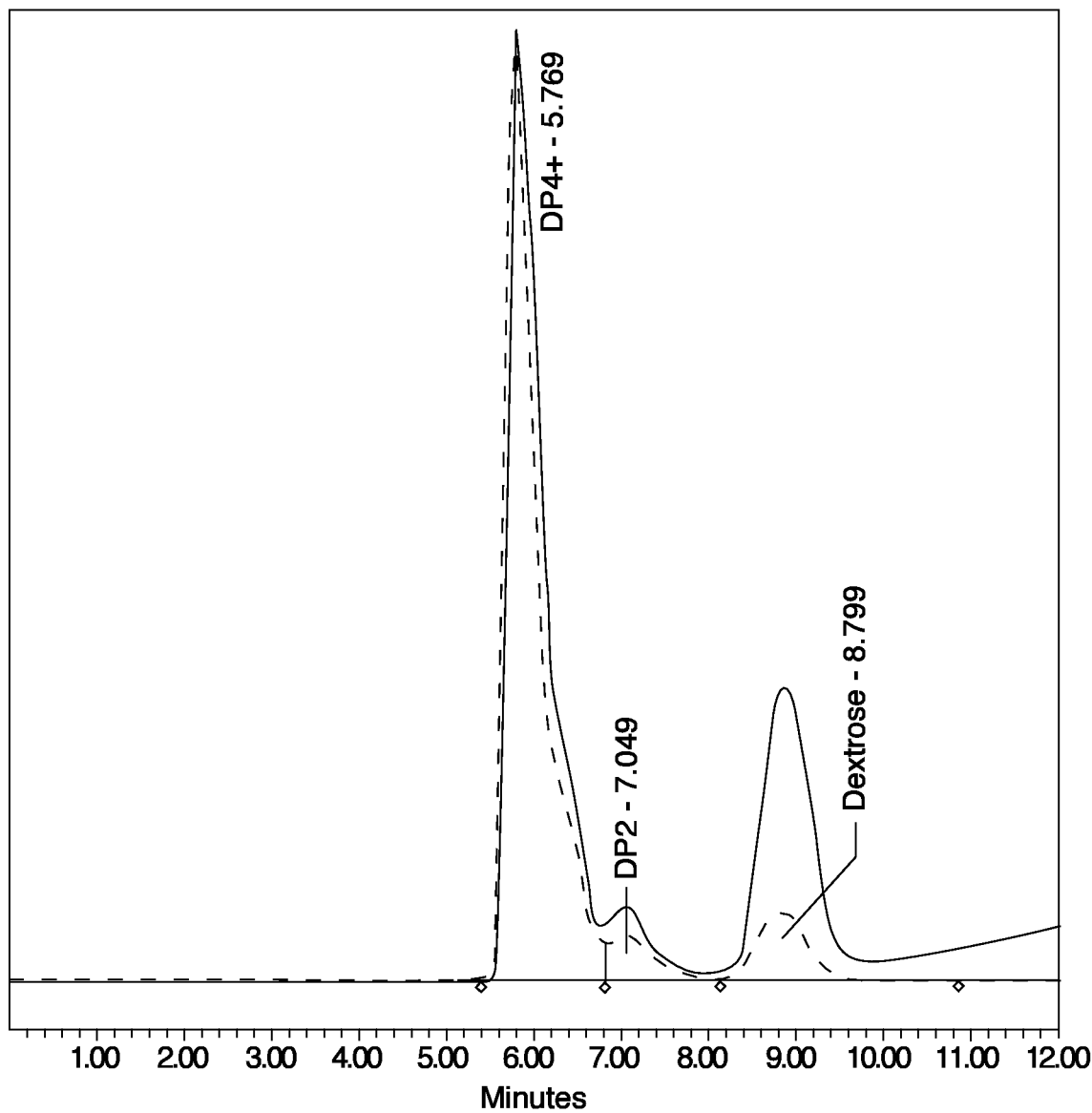
FIG. 13 is a chromatogram of the carbohydrate composition prepared in Example 4, pre- and post-enzymatic digestion.

As can be seen in FIG. 13, the 10H-1 product prepared in this example had about 9% glucose pre-enzymatic digestion, and about 26% glucose post-enzymatic digestion, as compared to a traditional 36DE corn syrup product in FIG. 12, which had about 13% glucose pre-enzymatic digestion and about 94% glucose post-enzymatic digestion. The comparison shows that, relative to the traditional 36DE corn syrup product, the carbohydrate composition prepared according to the disclosure demonstrates significantly lower digestibility.

Example 5

Linkage Analysis

For glycosyl linkage analysis, the carbohydrate compositions of the present disclosure and commercial products were permethylated, depolymerized, reduced, and acetylated; and the resulting partially methylated alditol acetates (PMAAs) analyzed by gas chromatography-mass spectrometry (GC-MS) as described by York, et al. (1985) *Methods Enzymol.* 118:3-40.

Initially, dry samples were suspended in about 200 μL of dimethyl sulfoxide and placed on a magnetic stirrer for 1-2 weeks. The samples were then permethylated by the method of Ciukanu and Kerek (1984) *Carbohydr. Res.* 131:209-217 (treatment with sodium hydroxide and methyl iodide in dry DMSO). The samples were subjected to the NaOH base for 15 minutes, then methyl iodide was added and left for 45 minutes. The base was then added for 10 minutes and finally more methyl iodide was added for 40 minutes. This addition of more methyl iodide and NaOH base was to ensure complete methylation of the carbohydrate composition. Following the sample workup, the permethylated material (PMAA) was hydrolyzed using 2 M trifluoroacetic acid (2 hours in a sealed tube at 121° C.), reduced with NaBD$_4$, and acetylated using acetic anhydride/trifluoroacetic acid. The resulting PMAAs were analyzed on a Hewlett Packard 7890A GC interfaced to a 5975C MSD (mass selective detector, electron impact ionization mode EI-MS); separation was performed on a 30m Supelco 2380 bonded phase fused silica capillary column.

As shown in Table 8, the 2A and 2B products (carbohydrate compositions prepared according to the present disclosure) have a very different linkage profile when compared to the commercially-available reduced-sugar low-digestibility products, Fibersol-2® resistant maltodextrin, Nutriose® resistant dextrin, and Promitor™ soluble corn fiber, comprising glucose only. In particular, the 2A and 2B products have higher degrees of branching as indicated by higher terminal glucose (about 1.4 to about 1.93 times, or about 40% to about 93% higher), along with about 60-75% less 1,4-linkage, about 20-35% more 1,6-linkages, and a 3.5-4.2 times higher ratio of 1,6-linkage to 1,4-linkage.

The 2A and 2B products have similar glycosyl linkages as Litesse® polydextrose; however, polydextrose has about 1.17-1.39 times more 1,2-linkage, and times (a 24-33% lower ratio of 1,4-linkage to 1,2-linkage. In addition, polydextrose is a polycondensation polymer of 90% glucose and 10% sorbitol, while the carbohydrate compositions of the present disclosure are polycondensation polymers of only glucose, or comprising less than 10% sorbitol.

TABLE 8

Linkage characteristics of current invention as compared to commercially available reduced-sugar low-digestibility products composed of glucose molecules

| | Products | | | | | |
|---|---|---|---|---|---|---|
| Base molecules | Litesse glucose + sorbitol | Promitor L85 glucose | Fibersol 2 glucose | Nutriose glucose | 2A product glucose | 2B product glucose |
| terminal glucose, % | 43.4 | 33.9 | 28.7 | 26.4 | 50.9 | 48.5 |
| 1,6 linkage, % | 19.3 | 14.6 | 13.3 | 13.8 | 17.5 | 17.8 |
| 1,4 linkage, % | 7.5 | 22.8 | 28.8 | 26.8 | 8.2 | 8.6 |
| 1,2 linkage, % | 7.5 | 5.8 | 4 | 4.1 | 5.4 | 6.4 |
| 1,3 linkage, % | 8.6 | 7.9 | 5.6 | 6.6 | 7.5 | 7.2 |
| 4,6 linkage, % | 4.1 | 3.7 | 10.6 | 10 | 2.5 | 3.7 |
| other linkages, % | 9.6 | 11.4 | 9 | 12.3 | 8 | 7.8 |

TABLE 8-continued

Linkage characteristics of current invention as compared to commercially available reduced-sugar low-digestibility products composed of glucose molecules

| Base molecules | Products | | | | | |
|---|---|---|---|---|---|---|
| | Litesse glucose + sorbitol | Promitor L85 glucose | Fibersol 2 glucose | Nutriose glucose | 2A product glucose | 2B product glucose |
| (1,6 + 1,4), % | 26.8 | 37.4 | 42.1 | 40.6 | 25.7 | 26.4 |
| 1,6/1,4 ratio | 2.6 | 0.6 | 0.5 | 0.5 | 2.1 | 2.1 |
| 1,6/4,6 ratio | 4.7 | 4.0 | 1.3 | 1.4 | 7.0 | 4.8 |
| 1,4/1,2 ratio | 1.0 | 3.9 | 7.2 | 6.5 | 1.5 | 1.3 |
| 1,4/1,3 ratio | 0.9 | 2.9 | 5.1 | 4.1 | 1.1 | 1.2 |
| (1,6 + 1,4)/1,2 ratio | 3.6 | 6.4 | 10.5 | 9.9 | 4.8 | 4.1 |
| (1,6 + 1,4)/1,3 ratio | 3.1 | 4.7 | 7.5 | 6.2 | 3.4 | 3.7 |

Example 6

Yeast Fermentation

For the in vitro fermentation test, the carbohydrate composition of present disclosure was made to about 20% DS with 0.05M citric buffer of pH 4.5, then treated with 1% (on dry weight basis) enzyme (a glucoamylase and pullulanase enzyme mixture, Optimax4060, Genecor International) at 60° C. for 28 hours to convert all digestible carbohydrates to glucose. Dry yeast (2.5% on testing material dry weigh basis) was added to the enzyme-treated material and the mixture was vigorously agitated at ambient temperature for 24 hours to fully remove glucose as $CO_2$ gas. After removing yeast cells by centrifugation, the solution was then treated with activated carbon followed by mixed resins (Dowex 66 and Dowex 88) to remove proteins, peptides, organic acids and ions, and then freeze dried. A liquid inulin, without any treatment as described above for the carbohydrate composition, was also freeze-dried. The freeze dried samples were used in an in vitro fermentation test using fresh human fecal material, according to the method described by Noack, et al. (*Nutrients* 2013, 5, 1500-1510).

As shown in FIG. 7, the carbohydrate composition of the present disclosure had a significantly lower and delayed gas formation compared to the liquid inulin.

Example 7

Granola Bars Comprising Carbohydrate Compositions

Granola bars were prepared using carbohydrate compositions according to the present disclosure, Litesse II® polydextrose, and Promitor 85™ soluble corn fiber, at 25% and 50% sugar reduction along with a full sugar control, as follows.

TABLE 9

Bars with 25% Reduced Sugar

| Component | Control with no sugar reduction | | 25% Reduced Sugar | |
|---|---|---|---|---|
| | % | (g) | % | (g) |
| Binder | | | | |
| Corn Syrup, Satin Sweet 65HM | 20.200 | 484.8 | 3.850 | 92.4 |

TABLE 9-continued

Bars with 25% Reduced Sugar

| Component | Control with no sugar reduction | | 25% Reduced Sugar | |
|---|---|---|---|---|
| | % | (g) | % | (g) |
| 80% Solution Bulking Agent | — | — | 16.350 | 392.4 |
| Fructose | 1.600 | 38.4 | 1.600 | 38.4 |
| Honey | 8.770 | 210.5 | 8.770 | 210.5 |
| Canola Oil | 1.230 | 29.5 | 1.230 | 29.5 |
| 10 DE Maltodextrin | 0.260 | 6.2 | 0.260 | 6.2 |
| Salt | 0.250 | 6.0 | 0.250 | 6.0 |
| Lecithin-Topcithin SF | 0.200 | 4.8 | 0.200 | 4.8 |
| Vanilla Extract | 0.200 | 4.8 | 0.200 | 4.8 |
| Baking Soda | 0.190 | 4.6 | 0.190 | 4.6 |
| Total (Binder) | 32.90 | 789.6 | 32.90 | 789.6 |
| Base | | | | |
| Generic Granola | 35.58 | 853.9 | 35.58 | 853.9 |
| Rice Crisps, Large | 6.12 | 146.9 | 6.12 | 146.9 |
| Almonds, Whole | 8.82 | 211.7 | 8.82 | 211.7 |
| Peanuts, dry roasted/no salt | 6.16 | 147.8 | 6.16 | 147.8 |
| Raisins | 8.82 | 211.7 | 8.82 | 211.7 |
| Cranberries, sweetened, dried, diced | 1.60 | 38.4 | 1.60 | 38.4 |
| Total Base | 67.10 | 1610.4 | 67.10 | 1610.4 |
| Total (Base + Binder) | 100.000 | 2400.0 | 100.000 | 2400.0 |

[1]Minor adjustments to corn syrup and 80% solution were made to accommodate slight differences in sugar content between bulking agents.
[2]Bulking agent syrups were adjusted to 80% solids with water

TABLE 10

Bars with 50% Reduced Sugar

| Component | Control with no sugar reduction | | 50% Reduced Sugar | |
|---|---|---|---|---|
| | % | (g) | % | (g) |
| Binder | | | | |
| Corn Syrup, Satin Sweet 65HM[1] | 30.3 | 727.9 | 0.0 | 0.0 |
| 80% SOLUTION bulking agent syrup[2] | — | — | 30.6 | 734.6 |
| Fructose | 1.6 | 38.4 | 1.6 | 38.4 |
| Honey | 8.8 | 210.5 | 8.5 | 203.8 |
| Canola Oil—CV 80 | 1.2 | 29.5 | 1.2 | 29.5 |
| 10DE Maltodextrin | 0.3 | 6.2 | 0.3 | 6.2 |
| Salt | 0.1 | 2.9 | 0.1 | 2.9 |
| Lecithin | 0.2 | 4.8 | 0.2 | 4.8 |

TABLE 10-continued

Bars with 50% Reduced Sugar

| Component | Control with no sugar reduction % | (g) | 50% Reduced Sugar % | (g) |
|---|---|---|---|---|
| Vanilla Extract | 0.2 | 4.8 | 0.2 | 4.8 |
| Baking Soda | 0.2 | 4.6 | 0.2 | 4.6 |
| Total (Binder) Base | 42.9 | 1029.6 | 42.9 | 1029.6 |
| Rolled Oats—.04 thick, toasted | 32.6 | 781.9 | 32.6 | 781.9 |
| Rice Crisps | 14.1 | 338.4 | 14.1 | 338.4 |
| Cranberries, sweetened diced | 1.6 | 38.4 | 1.6 | 38.4 |
| Raisins | 8.8 | 211.7 | 8.8 | 211.7 |
| Total Base | 57.1 | 1370.4 | 57.1 | 1370.4 |
| Total (Base + Binder) | 100.0 | 2400.0 | 100.0 | 2400.0 |

[1]Minor adjustments to corn syrup and 80% solution were made to accommodate slight differences in sugar content between bulking agents.
[2]Bulking agent syrups were adjusted to 80% solids with water The granola bars were prepared as follows. The oats were toasted in a tray dryer at 375° F. for about 30-45 seconds until a moisture content of about 4% was achieved. At least 24 hours later, the base ingredients were combined in a lightly-greased mixing bowl. The corn syrup and honey were weighed into Thermomix Vorwerks blender (Wuppertal, Del.), and the remaining dry blend was weighed together in a separate container. The oil/lecithin/flavor was then weighed together in a separate container. The syrup/water mixture was heated and mixed in the Thermomix Vorwerks blender to 70° C. at speed 3-4. The dry ingredients, followed by the oil/lecithin/flavor ingredients, were added while mixing. Mixing continued until all ingredients were fully incorporated. The binder was measured over the base and mixed well using hands until the base ingredients were fully enrobed. About 850 g of the mixture was pressed evenly into a bar pan using a Delrin rolling pin. The pressed mixture was cooled in a refrigerator for about 15-20 minutes, cut into bars (3¼"×1¼"), and sealed in metallic film.

Figure 8:
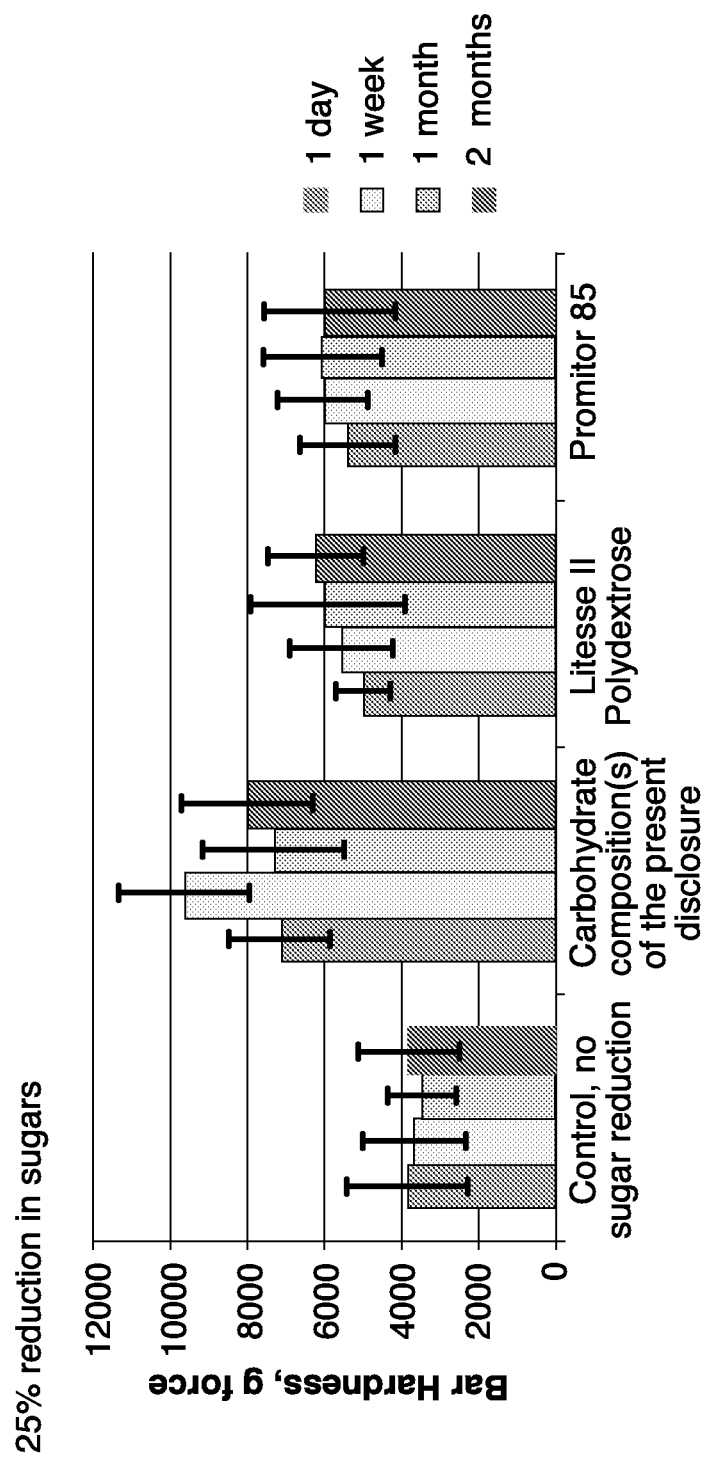
FIG. 8 is a graph showing hardness for granola bars prepared with 25% reduced sugar, incorporating carbohydrate compositions made according to an embodiment of the disclosure.
Figure 9:
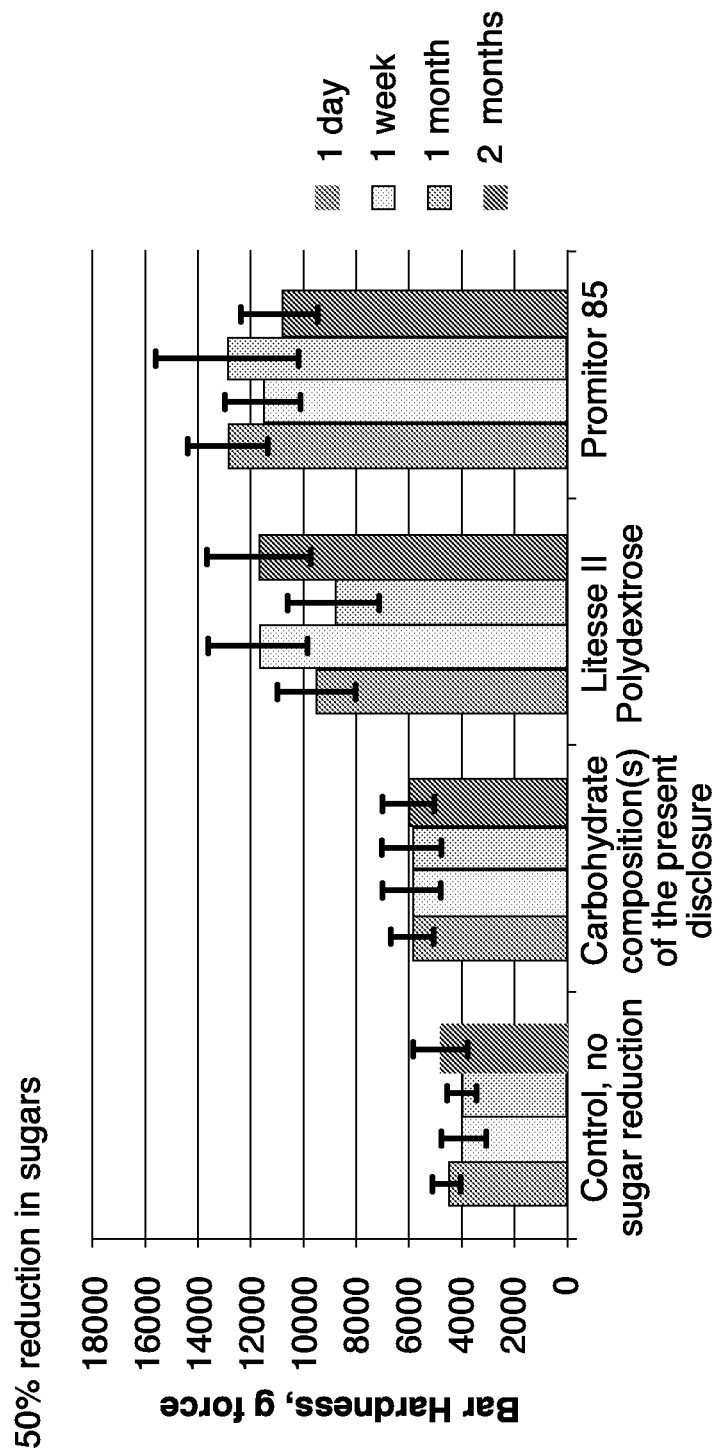
FIG. 9 is a graph showing hardness for granola bars prepared with 50% reduced sugar, incorporating carbohydrate compositions made according to an embodiment of the disclosure.

Subsequently, test bars were aged for 1 day, 1 week, 1 month, and 2 months. The bars were tested at each time point using a TA.XT Plus texture analyzer (Texture Technologies, Hamilton, Mass.) fitted with a 45° knife blade probe attached to a 50 kg load cell. Four bars were unwrapped and each bar was cut with the probe 4 times to a depth of 10 mm. The bar was moved ¾" to 1" away from the last cut to expose a fresh surface for a total of 16 measurements. The instrument test parameters were: pre-test speed 3.0 mm/sec; trigger force 15.0 g; test speed 3.0 mm/sec; post-test speed 10.0 mm/sec. The results were analyzed for maximum force and averaged. Results are shown in FIGS. 8-9.

Example 8

Cookies Comprising Carbohydrate Compositions

Sugar cookies were prepared using carbohydrate compositions according to the present disclosure, Litesse II® polydextrose, and Promitor 85™ soluble corn fiber, at 25% and 50% sugar reduction along with a full sugar control, as follows.

TABLE 11

Cookies with 25% and 50% Reduced Sugar

| | Control with no sugar reduction | | 25% sugar reduction | | 50% sugar reduction | |
|---|---|---|---|---|---|---|
| | % | (g) | % | (g) | % | (g) |
| Trans-Advantage P100 Shortening | 16.49 | 247.4 | 16.49 | 247.4 | 16.49 | 247.4 |
| Sugar[1] | 28.15 | 422.3 | 20.60 | 309.0 | 13.05 | 195.8 |
| Bulking Agent[1] | | | 10.11 | 151.7 | 20.21 | 303.2 |
| Nonfat Dry Milk (NFDM) | 1.58 | 23.7 | 1.58 | 23.7 | 1.58 | 23.7 |
| Salt | 0.64 | 9.6 | 0.64 | 9.6 | 0.64 | 9.6 |
| Whole Eggs, dried | 3.24 | 48.6 | 3.24 | 48.6 | 3.24 | 48.6 |
| Water[1] | 9.11 | 136.7 | 6.55 | 98.3 | 4.00 | 60.0 |
| All Purpose Flour | 39.51 | 592.7 | 39.51 | 592.7 | 39.51 | 592.7 |
| Baking Powder | 1.28 | 19.2 | 1.28 | 19.2 | 1.28 | 19.2 |
| Total | 100 | 1500 | 100 | 1500.0 | 100 | 1500.0 |

[1]Sugar, bulking agent and water were adjusted to obtain desired sugar reduction and equivalent moisture content in the dough.

The sugar cookies were prepared by first scaling shortening into the bottom of a Hobart N-50 mixing bowl, and then the sugar and bulking agent (if used), NFDM, salt, and flavor were added. The dough was mixed 1 minute at speed 1, when the mixer was stopped and the bowl scraped. The dough was mixed for another 2 minutes at medium speed. The water/eggs were weighed and added to the mixture, and mixing continued for an additional 2 minutes at speed 1. The flour and baking powder were combined and added to the mixture, and mixing continued for another 1 minute at speed 1. The bowl and paddle were scraped again, and mixing resumed for another 1 minute at speed 1. The cookies were rolled and cut out as per AACC method #10-50, and baked in a reel oven at 375° F. for 12 minutes.

Figure 10:
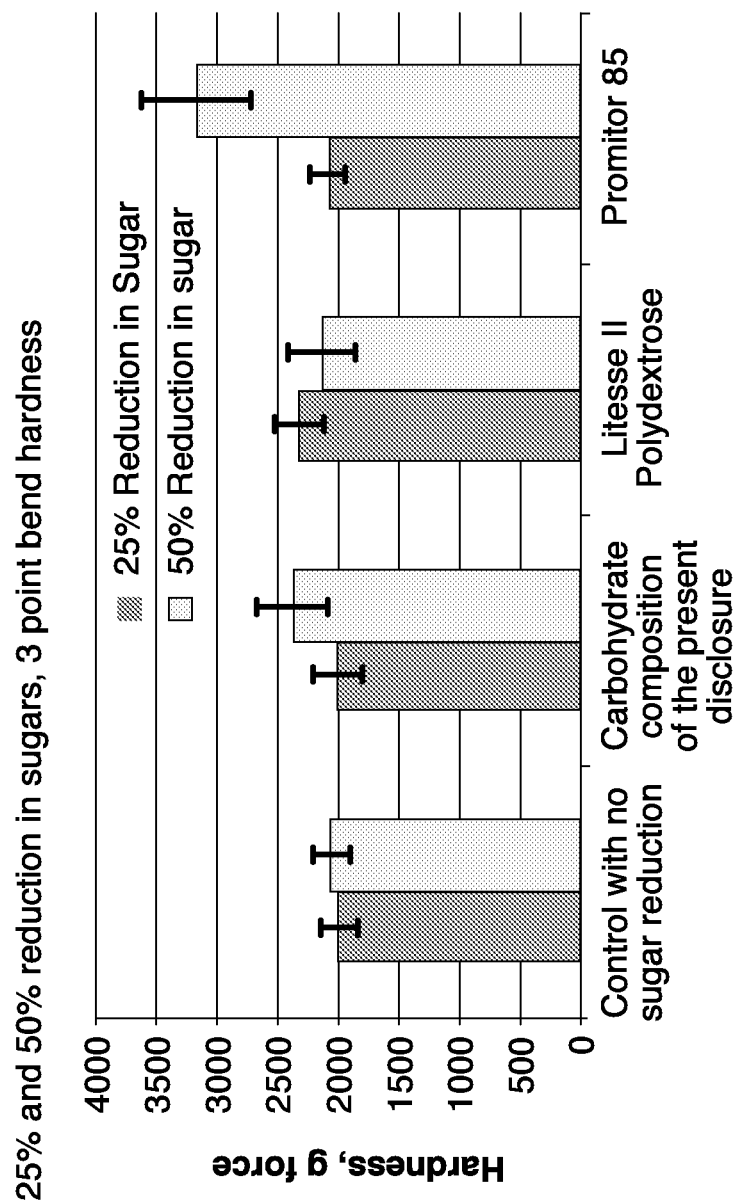
FIG. 10 is a graph showing harness for cookies prepared with 25% and 50% reduced sugar, incorporating carbohydrate compositions made according to an embodiment of the disclosure.
Figure 11:
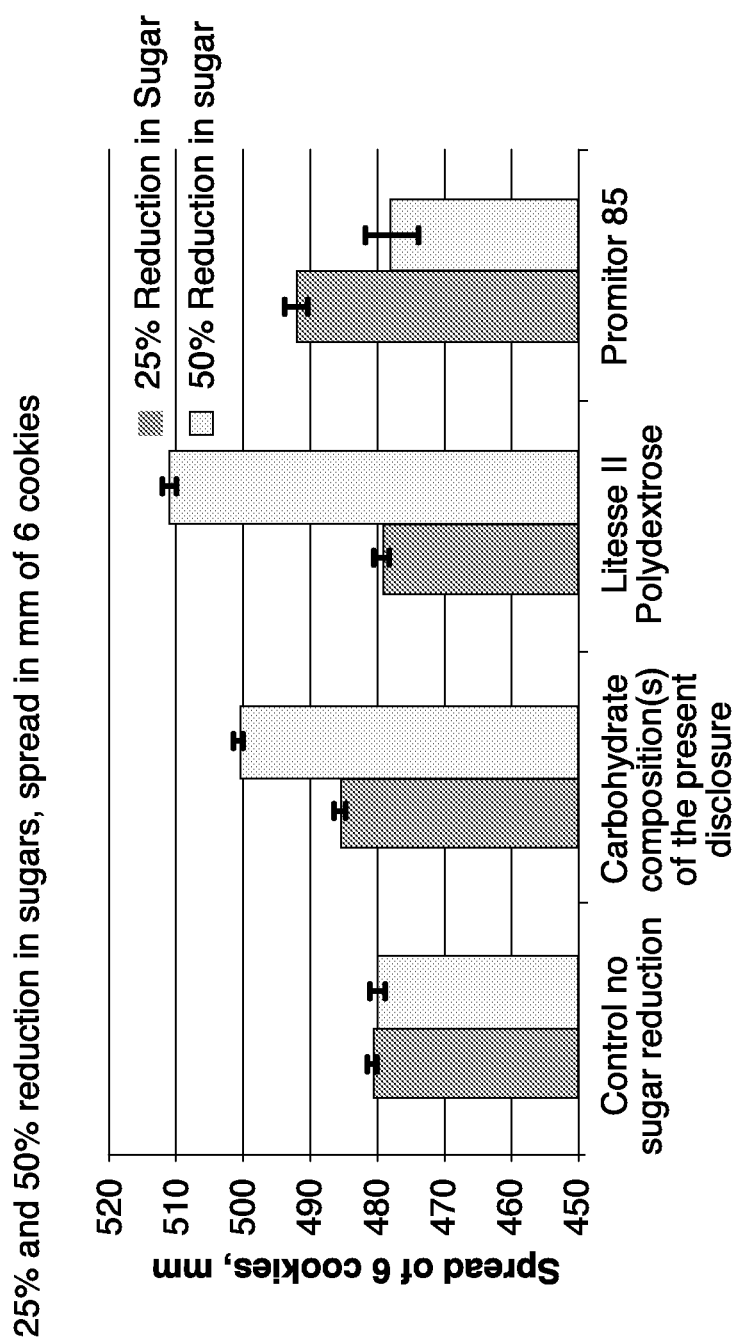
FIG. 11 is a graph showing cookie spread for cookies prepared with 25% and 50% reduced sugar, incorporating carbohydrate compositions made according to an embodiment of the disclosure.

The cookies were tested for hardness a day after baking using TA.XT Plus texture analyzer with a 3 point bend apparatus in which a cookie was placed on parallel rails and a knife blade was used to break the cookie. Hardness of at least 6 and as many as 12 cookies was recorded. Cookies were also analyzed for spread using a standard American Association of Cereal Chemists International (AACCI #10-50) test. The width of 6 cookies was measured using a custom fixture designed for test. For cookie spread, 6 cookies were lined up and a measurement taken in millimeters. The cookies were turned 90° and the measurement taken again as per protocol and then repeated a 3$^{rd}$ time. The measurements were averaged and results are shown in FIGS. 10-11.

As seen in Examples 7 and 8, and as discussed above, foodstuffs comprising the carbohydrate compositions described herein have shown properties relative to existing reduced-sugar, reduced-calorie sweeteners, e.g., Litesse polydextrose, Nutriose resistant dextrin, Fibersol-2 resistant maltodextrin, and Promitor soluble corn fiber, that are just as good or are improved.

Example 9

Analysis of Total Soluble Dietary Fiber in Carbohydrate Compositions

The carbohydrate compositions prepared in Examples 2-4 above were analyzed for both traditional total dietary fiber (TDF) and digestion-resistant oligosaccharides (ROs) according to methods AOAC 2001.03 and AOAC 991.43, as follows. Samples were first run by a traditional dietary fiber method, in which digestion with three enzymes (protease, amylase, and amyloglucosidase) was carried out in an MES-Tris buffer and traditional dietary fiber was precipitated with ethanol. The final filtrate solution from the traditional total dietary fiber analysis was collected after filtering off the precipitated dietary fiber. Resistant oligosaccharides are soluble in this alcoholic solution, so the filtrate was evaporated to 20 mL, deionized through a series of anion and cation exchange columns, and then reconcentrated to 10 mL. The solution was mixed well and syringe filtered prior to analysis by size exclusion HPLC.

TABLE 12

Analysis of Total Soluble Dietary Fiber in Carbohydrate Compositions

| | Total dietary fiber, % on DS | | |
|---|---|---|---|
| Example | fiber | resistant oligosaccharides | total |
| 2A | 13.1 | 77.4 | 90.5 |
| 2B | 27.2 | 69.2 | 96.4 |
| 10A | 10.4 | 74.1 | 84.5 |
| 10B | 41.6 | 59.6 | 101.2 |
| 10C | 2.1 | 78.0 | 80.1 |
| 10D | 26.3 | 68.7 | 95.0 |
| 10E | 5.2 | 63.6 | 68.8 |
| 10F | 18.2 | 57.5 | 75.7 |
| 10G | 9.6 | 66.4 | 76.0 |
| 10H1 | 27.5 | 60.5 | 88.0 |

As seen in Table 12, carbohydrate compositions prepared according to embodiments of the disclosure can comprise a total soluble dietary fiber content of greater than about 60% by weight of the composition.

It is to be understood that while the present disclosure has been described in conjunction with the detailed description thereof, the foregoing description is intended to illustrate and not limit the scope of the disclosure, which is defined by the scope of the appended claims. Other aspects, advantages, and modifications are within the scope of the following claims.

The invention claimed is:

1. A carbohydrate composition comprising saccharides comprising greater than 90% glucose molecules, said carbohydrate composition comprising:
   less than about 30% DP1+2, on a dry weight basis;
   a weight average molecular weight ranging from about 300 to about 3200 daltons;
   a total amount of DP3-5 greater than about 20%;
   a ratio of 1,6-glycosidic/1,4-glycosidic linkages ranging from about 1.0 to about 4.0;
   a ratio of 1,4-glycosidic/1,2-glycosidic linkages less than about 2.0;
   a digestibility ranging from about 5 to about 50%; and
   a total soluble dietary fiber concentration greater than 60%.

2. The carbohydrate composition according to claim 1, comprising saccharides comprising greater than 90% glucose molecules, said carbohydrate composition comprising:
   less than about 30% DP1+2, on a dry weight basis;
   a weight average molecular weight ranging from about 500 to about 2000 daltons;
   a polydispersity index ranging up to about 2.0;
   greater than about 10% 1,6-glycosidic linkages;
   a ratio of 1,6-glycosidic/1,4-glycosidic linkages ranging from about 1.0 to about 3.0;
   less than about 35% total 1,6-glycosidic and 1,4-glycidic linkages;
   a digestibility ranging from about 5 to about 50%; and/or
   a total soluble dietary fiber concentration greater than 60%.

3. The carbohydrate composition of claim 1, comprising saccharide molecules comprising greater than 90% glucose, said carbohydrate composition comprising:
   greater than about 15% 1,6-glycosidic linkages;
   a ratio of 1,6-glycosidic/1,4-glycosidic linkages ranging from about 1.0 to about 3.0;
   less than about 20% 1,4-glycosidic linkages; and/or
   a ratio of 1,4-glycosidic/1,2-glycosidic linkages of less than about 2.0.

4. The carbohydrate composition of claim 1, comprising saccharide molecules comprising greater than 90% glucose, said carbohydrate composition comprising:
   an amount of 1,6-glycosidic linkages ranging from about 15% to about 25%;
   a ratio of 1,6-glycosidic/1,4-glycosidic linkages ranging from about 2.0 to about 2.5;
   less than about 10% 1,4-glycosidic linkages; and/or
   a ratio of 1,4-glycosidic/1,2-glycosidic linkages ranging from about 1.0 to about 2.0.

5. A carbohydrate composition comprising saccharides comprising greater than 90% glucose molecules, said carbohydrate composition comprising:
   less than about 30% DP1+2, on a dry weight basis;
   a weight average molecular weight ranging from about 500 to about 2000 daltons;
   a polydispersity index ranging up to about 2.0;
   a total amount of DP3-5 greater than about 20%;
   a ratio of (DP3-5)/DP6+ greater than about 0.25;
   a digestibility ranging from about 5 to about 50%; and
   a total soluble dietary fiber concentration greater than 60%.

6. The carbohydrate composition of claim 5, wherein the composition comprises at least one of:
   a total amount of DP3-5 is greater than about 25%; and/or
   a ratio of (DP3-5)/DP6+ greater than about 0.3.

7. The carbohydrate composition of claim 5, wherein the composition comprises at least one of:
   the total amount of DP3-5 ranges from about 25% to about 50%; and/or
   a ratio of (DP3-5)/DP6+ ranges from about 0.3 to about 1.5.

8. The carbohydrate composition according to claim 1, wherein the polydispersity index ranges from about 1.1 to about 1.8.

9. The carbohydrate composition according to claim 1, wherein the DP1+2 ranges from about 5% to about 15%.

10. The carbohydrate composition according to claim 1, wherein the DP1+2 ranges from about 5% to about 15%.

11. The carbohydrate composition according to claim 1, having at least one of:
    a CIRF value of less than about 8 in aqueous solution at 50% dry solids;
    a caloric value of less than about 4 kcal/gram on a dry weight basis;
    a digestibility ranging from about 5% to about 35%; and/or
    a viscosity less than about 6000 cPs, measured at 75% DS and 38° C.

12. The carbohydrate composition according to claim 1, comprising resistant oligosaccharides in an amount greater than 50% on a dry weight basis.

13. The carbohydrate composition according to claim 1 comprising less than 10% sorbitol.

14. The carbohydrate composition according to claim 1 in syrup form, liquid form, or dry form.

15. A product chosen from food or beverage products or nutritional supplements comprising a carbohydrate composition comprising:
- less than about 30% DP1+2, on a dry weight basis;
- a weight average molecular weight ranging from about 300 to about 3200 daltons;
- total amount of DP3-5 greater than about 20%;
- a digestibility ranging from about 5 to about 50%;
- and further wherein the composition comprises either:
- a ratio of 1,6-glycosidic/1,4-glycosidic linkages ranging from about 1.0 to about 4.0; or
- a ratio of 1,4-glycosidic/1,2-glycosidic linkages less than about 2.0.

16. The product chosen from food or beverage products or nutritional supplements according to claim 15, wherein said carbohydrate composition comprises:
- less than about 30% DP1+2, on a dry weight basis;
- a weight average molecular weight ranging from about 500 to about 2000 daltons;
- a polydispersity index ranging up to about 2.0;
- greater than about 10% 1,6-glycosidic linkages;
- a ratio of 1,6-glycosidic/1,4-glycosidic linkages ranging from about 1.0 to about 3.0;
- less than about 35% total 1,6-glycosidic and 1,4-glycidic linkages, and/or
- a digestibility ranging from about 5 to about 50%.

17. The product chosen from food or beverage products or nutritional supplements according to claim 15, wherein said carbohydrate composition comprises:
- less than about 30% DP1+2, on a dry weight basis;
- a weight average molecular weight ranging from about 500 to about 2000 daltons;
- a polydispersity index ranging up to about 2.0;
- a total amount of DP3-5 greater than about 25%;
- a ratio of (DP3-5)/DP6+ greater than about 0.25, and;
- a digestibility ranging from about 5 to about 50%.

18. A process for preparing a carbohydrate composition comprising: subjecting a feed composition comprised of a saccharide feedstock comprising greater than 90% glucose, and at least one catalyst to elevated temperature to produce a composition comprising:
- less than about 30% DP1+2;
- a weight average molecular weight ranging from about 300 to about 3200 daltons;
- total amount of DP3-5 greater than about 20%;
- greater than about 10% 1,6-glycosidic linkages;
- less than about 35% total 1,6-glycosidic and 1,4-glycidic linkages;
- a ratio of 1,6-glycosidic/1,4-glycosidic linkages ranging from about 1.0 to about 4.0 or
- a ratio of 1,4-glycosidic/1,2-glycosidic linkages less than about 2.0;
- a digestibility ranging from about 5 to about 50%; and
- a total soluble dietary fiber concentration greater than 60%.

19. The process for preparing a carbohydrate composition according to claim 18, wherein the pH of the feed composition ranges from about 1.0 to about 2.5.

20. The process for preparing a carbohydrate composition according to claim 18, wherein the saccharide feedstock is chosen from 95% dextrose corn syrup.

* * * * *